US012675497B2

(12) United States Patent
Pineda et al.

(10) Patent No.: US 12,675,497 B2
(45) Date of Patent: Jul. 7, 2026

(54) DATA PREPARATION AND MODELING USING ARTIFICIAL INTELLIGENCE

(71) Applicant: STRATEGY INC, Vienna, VA (US)

(72) Inventors: Mohamed Diakite Pineda, Vienna, VA (US); Jaime Alberto Perez, Brambleton, VA (US); Zhili Cheng, Loring, VA (US); Ruiqing Xu, Hangzhou (CN); Witold Tomasz Cichon, Washington DC, DC (US); Ananya Ojha, Dunn Loring, VA (US); Jeffrey Clay Courcelle, Atkinson, NH (US)

(73) Assignee: Strategy Inc, Vienna, VA (US)

( * ) Notice: Subject to any disclaimer, the term of this patent is extended or adjusted under 35 U.S.C. 154(b) by 0 days.

(21) Appl. No.: 19/193,394

(22) Filed: Apr. 29, 2025

(65) Prior Publication Data

US 2025/0335455 A1    Oct. 30, 2025

Related U.S. Application Data

(60) Provisional application No. 63/640,149, filed on Apr. 29, 2024.

(51) Int. Cl.
*G06F 16/248*    (2019.01)
*G06F 16/22*    (2019.01)

(52) U.S. Cl.
CPC ........ *G06F 16/248* (2019.01); *G06F 16/2237* (2019.01)

(58) Field of Classification Search
CPC ........................... G06F 16/248; G06F 16/2237

USPC ........................................................ 707/722
See application file for complete search history.

(56) References Cited

U.S. PATENT DOCUMENTS

| | | | |
|---|---|---|---|
| 7,979,475 | B2 | 7/2011 | Mack |
| 9,280,581 | B1 | 3/2016 | Grimes et al. |
| 9,552,403 | B2 | 1/2017 | Bhattacharjee et al. |
| 9,563,670 | B2 | 2/2017 | Wasson et al. |
| 9,740,802 | B2 | 8/2017 | Nixon et al. |
| 9,851,952 | B2 | 12/2017 | Rodrigues et al. |
| 10,002,126 | B2 | 6/2018 | Grosset et al. |
| 10,268,753 | B2 | 4/2019 | Bar-or et al. |
| 10,437,860 | B2 | 10/2019 | Barday et al. |
| 11,082,441 | B1 | 8/2021 | Bouguerra et al. |

(Continued)

*Primary Examiner* — Cam Y T Truong

(74) *Attorney, Agent, or Firm* — Fish & Richardson P.C.

(57) ABSTRACT

Methods, systems, and apparatus, including computer-readable media, for data preparation and modeling using artificial intelligence. In some implementations, a system receives user input that indicates one or more data sets. In response, the system generates a set of recommendations for data modeling, data preparation, or data enrichment for the one or more data sets, where at least one recommendation in the set of recommendations is generated using one or more artificial intelligence and/or machine learning (AI/ML) models. The system provides the set of recommendations for display in the user interface in association with one or more interactive controls to accept or dismiss the recommendations. In response to receiving user input the system updates the data model or the one or more data sets to apply an update corresponding to an accepted recommendation. The system provides the updated data set or updated data model to a chatbot or other application.

18 Claims, 11 Drawing Sheets

(56) References Cited

U.S. PATENT DOCUMENTS

| | | | |
|---|---|---|---|
| 11,461,687 B1 | 10/2022 | Shaikh et al. | |
| 12,190,378 B2 | 1/2025 | Paduchuru et al. | |
| 12,197,505 B2 | 1/2025 | Atallah et al. | |
| 12,271,162 B2 | 4/2025 | Givot et al. | |
| 2012/0158765 A1* | 6/2012 | Kumar | G06F 16/3325 |
| | | | 707/766 |
| 2022/0309171 A1 | 9/2022 | Du et al. | |
| 2023/0222109 A1 | 7/2023 | Mack | |
| 2023/0297346 A1 | 9/2023 | Tchankotadze et al. | |
| 2025/0045332 A1 | 2/2025 | Monk et al. | |
| 2025/0077785 A1 | 3/2025 | Moses et al. | |
| 2025/0238564 A1* | 7/2025 | Tehranchi | G06N 20/00 |

* cited by examiner

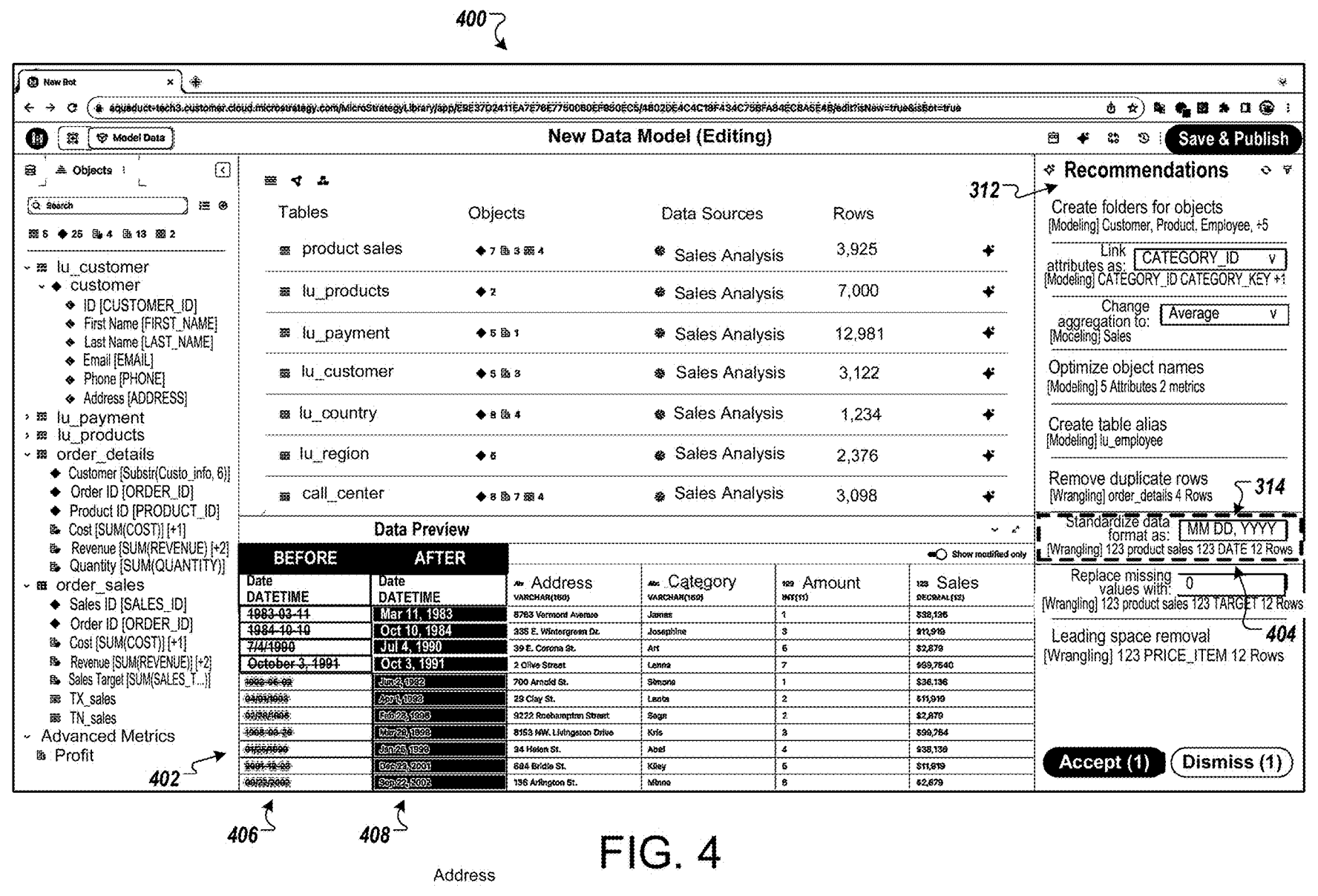

400

New Data Model (Editing)

Save & Publish

Recommendations — 312

Create folders for objects
[Modeling] Customer, Product, Employee, +5

Link CATEGORY_ID ∨
attributes as: [Modeling] CATEGORY_ID CATEGORY_KEY +1

Change Average ∨
aggregation to: [Modeling] Sales

Optimize object names
[Modeling] 5 Attributes 2 metrics

Create table alias
[Modeling] lu_employee

Remove duplicate rows
[Wrangling] order_details 4 Rows

Standardize data — 314
format as: MM DD YYYY
[Wrangling] 123 product sales 123 DATE 12 Rows Replace missing 0
values with:
[Wrangling] 123 product sales 123 TARGET 12 Rows — 404

Leading space removal
[Wrangling] 123 PRICE_ITEM 12 Rows

Accept (1)    Dismiss (1)

| Tables | Objects | Data Sources | Rows |
|---|---|---|---|
| product sales | ◆ 7 ▦ 3 ▦ 4 | ❋ Sales Analysis | 3,925 |
| lu_products | ◆ 2 | ❋ Sales Analysis | 7,000 |
| lu_payment | ◆ 5 ▦ 1 | ❋ Sales Analysis | 12,981 |
| lu_customer | ◆ 5 ▦ 3 | ❋ Sales Analysis | 3,122 |
| lu_country | ◆ 8 ▦ 4 | ❋ Sales Analysis | 1,234 |
| lu_region | ◆ 6 | ❋ Sales Analysis | 2,376 |
| call_center | ◆ 8 ▦ 7 ▦ 4 | ❋ Sales Analysis | 3,098 |

Show modified only

Model Data — 402

Objects

Search

▦ 6 ◆ 25 ▦ 4 ▦ 13 ▦ 2

∨ ▦ lu_customer
  ∨ ◆ customer
    ◆ ID [CUSTOMER_ID]
    ◆ First Name [FIRST_NAME]
    ◆ Last Name [LAST_NAME]
    ◆ Email [EMAIL]
    ◆ Phone [PHONE]
    ◆ Address [ADDRESS]
> ▦ lu_payment
> ▦ lu_products
∨ ▦ order_details
  ◆ Customer [Substr(Custo_info, 6)]
  ◆ Order ID [ORDER_ID]
  ◆ Product ID [PRODUCT_ID]
  ▦ Cost [SUM(COST)] [+1]
  ▦ Revenue [SUM(REVENUE)] [+2]
  ▦ Quantity [SUM(QUANTITY)]
∨ ▦ order_sales
  ◆ Sales ID [SALES_ID]
  ◆ Order ID [ORDER_ID]
  ▦ Cost [SUM(COST)] [+1]
  ▦ Revenue [SUM(REVENUE)] [+2]
  ▦ Sales Target [SUM(SALES_...]
  ▦ TX_sales
  ▦ TN_sales
∨ Advanced Metrics
  ▦ Profit

Data Preview

| | BEFORE | AFTER | | | | |
|---|---|---|---|---|---|---|
| | Date DATETIME | Date DATETIME | Aʙᴄ Address VARCHAR(050) | Aʙᴄ Category VARCHAR(050) | 123 Amount INT(11) | 123 Sales DECIMAL(193) |
| | 1983-03-11 | Mar 11, 1983 | 8783 Vermood Avenue | Jamis | 1 | $38,136 |
| | 1984-10-10 | Oct 10, 1984 | 3335 E. Wintergreen Dr. | Josephine | 3 | $12,919 |
| | 744.1990 | Jul 4, 1990 | 39 E. Corona St. | Ari | 6 | $2,879 |
| | October 3, 1991 | Oct 3, 1991 | 2 Olive Street | Lorna | 7 | $69,7640 |
| | | Jun 24, 1993 | 700 Arnold St. | Simone | 1 | $36,136 |
| | | Sep 11, 1993 | 23 Clay St. | Laura | 2 | $11,910 |
| | | Feb 23, 1993 | 9222 Roehampton Street | Sage | 2 | $2,879 |
| | | Jun 25, 1995 | 8153 NW. Livingston Drive | Kris | 3 | $99,764 |
| | | Jan 24, 1998 | 34 Helen St. | Abel | 4 | $38,136 |
| | | Feb 23, 2001 | 684 Bridie St. | Kiley | 6 | $11,919 |
| | | Sep 22, 2006 | 136 Arlington St. | Mirae | 6 | $2,879 |

— 406    408

Address

FIG. 4

DATA PREPARATION AND MODELING USING ARTIFICIAL INTELLIGENCE

CROSS-REFERENCE TO RELATED APPLICATIONS

This application claims the benefit of priority to U.S. Provisional Patent Application No. 63/640,149, filed on Apr. 29, 2024, the entire contents of which are incorporated by reference herein.

BACKGROUND

The present specification relates to techniques for data preparation and data modeling that leverage artificial intelligence and machine learning.

Databases and other data processing systems often use a data model or data schema to interpret the content of data sets and the connections among data sets. In many cases, creating a data model or data schema is a time-consuming process that requires administrators to perform many manual steps.

SUMMARY

In some implementations, a computer system provides functionality for automatic data preparation and modeling using artificial intelligence or machine learning (AI/ML) models, such as large language models (LLMs). For example, the computer system can provide an interface through which a user can create or edit a data model.

The disclosed techniques provide a platform that streamlines data preparation and modeling for analysis and chatbot integration. The platform automates the data cleaning, transformation, and enrichment processes. This efficiency reduces manual input and expertise requirements, increasing accuracy of generated data models.

As discussed further below, the computer system can provide data models that are enriched using AI/ML models. Integration with AI/ML models enables automatic detection and correction of errors and inconsistencies in the data, and automatic conversion of data into suitable format for analysis. The computer system provides a guided experience that prompts next actions from the user in order to prepare and edit the data model.

The disclosed techniques enable users to quickly and easily ingest, clean, and transform multiple different data sets into an integrated data model. Data previews are provided to the user at each step to present a clear representation of the prepared data. Version history is maintained, allowing users to roll back changes if necessary. Exported data is compatible with various analytics tools.

In some implementations, a computer system provides functionality for automated and semi-automated data modeling, powered by artificial intelligence or machine learning (AI/ML) models, such as large language models (LLMs). When a user creates or edits a data model or data schema, the computer system can analyze data set(s) and their metadata to automatically generate recommended actions for, for example, data cleansing, data modeling, and data enrichment. The computer system can then indicate the recommended actions as recommendations that the user can apply, edit and then apply, or dismiss. In some cases, when the computer system determines that an action has a high level of confidence of being appropriate for the data set(s) (e.g., a confidence score above a threshold), the computer system can apply the action automatically.

In general, the computer system can use the AI/ML models to identify, assess, and/or implement changes to data sets and/or their corresponding data models or data schemas. At each stage, the computer system can analyze the output of the AI/ML models to apply additional policies or supplement the output. For example, the recommendations for cleaning or enriching a data set or for modeling a data set can be based on a combination of (i) items generated by AI/ML models as well as (ii) rule, policies, criteria, user preferences, statistical processing, or other processing by the computer system. The computer system can edit or alter items proposed by the AI/ML models to make them more appropriate for a particular data set or data model. As another example, the computer system can filter or select from among the items proposed by the AI/ML models to ensure that changes to data sets or data models meet standards for relevance or appropriateness before being recommended or applied.

The system can provide information about a data set to an AI/ML model and request that the AI/ML model identify types of changes that are most appropriate for the data set. In this process, the system can provide the AI/ML model metadata for the dataset, data labels (e.g., column names, descriptions, identifiers, etc.), sample data or synthetic data of a similar type, an existing data model or data schema, or other information about the data set. The system can also provide the AI/ML model information about a set of operations or types of operations (e.g., transformations, edits, functions, etc.) to consider. The system can also provide the AI/ML model information about previous data models or data sets, including historical information about other data sets and corresponding changes that were made (e.g., data processing or data modeling recommendations that were accepted and the data contexts in which they were accepted). With information about the types of previous changes that were accepted or applied by users, and the contexts in which they were applied, the AI/ML models can more accurately select changes that are appropriate and are likely to be accepted by users. In some ways, the information about accepted recommendations or changes provides a form of learning over time for the system as a whole, so that even an AI/ML model that is not retrained based on the data can still have the accuracy of its selections improve over time as more history data is gathered.

The computer system can use AI/ML models to assess whether any of various types of actions are appropriate for one or more data sets or their data models. The system can instruct the AI/ML models to generate scores or rankings of proposed changes (whether identified by the AI/ML models, the computer system, or a combination of both) to indicate the relevance or appropriateness for the particular data set(s) of interest to the user. For example, the computer system can instruct the AI/ML models to generate confidence scores for each change, or to group proposed changes into categories that specify the priority or likelihood that the changes should be applied. The computer system may additionally or alternatively generate its own scores or measures of the relevance, confidence, or appropriateness of different changes. The computer system can then use scores that it determined and/or the AI/ML model determined to select a subset to recommend to a user.

The computer system can use AI/ML models to implement changes to data sets or data models or data schemas. For example, for each change to a data set or data model that the computer system selects (e.g., from among changes proposed by an AI/ML model for one or more data sets) to be recommended or applied, the computer system can instruct the AI/ML model to generate interpretable or executable code to perform the change. For example, when a data enrichment action is identified, the computer system can instruct the AI/ML model to generate Python code to perform the data enrichment action. The computer system stores the code that the AI/ML model generates so the data enrichment action can be applied when the user approves. In addition, the code can be viewed or edited by the user, if desired. To assist the AI/ML model in generating accurate and effective code that carries out the desired action, the computer system 110 can provide a set of information that specifies the names or identifiers of data objects (e.g., columns, tables, etc.) and the semantic meanings for and relationships among those data objects. In addition, the computer system 110 can provide the AI/ML model information about rules, policies, or standards to be applied, as well as the functional characteristics (e.g., syntax, functions available, operations supported, etc.) of the data processing system that will run the code. As a result, the computer system 110 can guide AI/ML models to generate highly accurate codes segments to implement the various changes for data modeling or data adjustment.

After a user has approved or applied recommended actions, the computer system can store the list of indicated changes to be applied at a future time, such as when publishing the data model or providing access to another system. This improves efficiency by limiting the number of times that data set and data model need to be altered. For example, the computer system accumulates changes to a data set as the user accepts some recommendations and rejects others. If the user desires to add additional changes, or remove previously accepted changes, this can be done by simply adjusting the list of tasks or changes, with minimal delay. The actual changes to the data set (e.g., filling in empty fields, removing whitespace, etc.) can be performed together as a group, by performing the operations of the code segments corresponding to those changes in the process of publishing or providing access to the data model or data sets.

The computer system can be configured to recommend and carry out many different types of actions for data modeling. These include, for example, defining data objects (e.g., attributes, attribute forms, metrics, facts) from data sets (e.g., tables, columns, etc.), setting relationships among data objects, grouping or merging data objects, creating multi-form attributes (e.g., detecting that are multiple columns that can be associated together as an attribute form), validating relationships among data objects, creating new relationships among data objects, generating names or labels or other metadata for data objects, and so on.

The computer system can also be configured to perform data adjustment actions, such as data enrichment, data wrangling, data cleansing, data transformation, etc. To assist in identifying these actions, the computer system can determine characteristics of data sets and their data objects, including by performing statistical analysis of values in the data set and comparing with reference data (e.g., previous data sets analyzed, data representative of various known types of data, etc.). The computer system can then provide the data characteristics, along with descriptions and other metadata, to the AI/ML models so that the AI/ML models can more accurately determine data adjustment actions that are appropriate.

For example, data enrichment actions can include supplementing a data set (e.g., filling in missing data), verifying or validating data, or merging or associating data from different sources into an integrated data set. In some cases, data enrichment includes combining a customer's own data (e.g., from internal or customer-provided sources) with additional data from other sources, including potentially external or third-party data sources.

In one general aspect, a method performed by one or more computers includes: providing, by the one or more computer, data for a user interface to create or edit a data model; receiving, by the one or more computers, user input through the user interface that indicates one or more data sets; in response to receiving the user input indicating the data set, generating, by the one or more computers, a set of recommendations for data modeling, data preparation, or data enrichment for the one or more data sets, wherein at least one recommendation in the set of recommendations is generated using one or more artificial intelligence and/or machine learning (AI/ML) models; providing, by the one or more computers, the set of recommendations for display in the user interface in association with one or more interactive controls to accept or dismiss the recommendations; in response to receiving user input accepting one or more of the recommendations in the set of recommendations, updating, by the one or more computers, the data model or the one or more data sets to apply an update corresponding to the accepted recommendation; and providing, by the one or more computers, the updated data set or updated data model to a chatbot or other application.

In some implementations, the one or more AI/ML models comprises a large language model (LLM).

In some implementations, the method includes repeatedly providing additional recommendations for display in the user interface as the data model is being created.

In some implementations, the method includes prioritizing recommendations for presentation in the user interface based on user acceptance or user dismissal of previous recommendations.

In some implementations, the method includes learning from user input that accepts or dismisses recommendations for data modeling, data preparation, or data enrichment, to alter which recommendation are presented for creation or editing of future data models.

In some implementations, the method includes searching through existing data repositories using to find data sets and models; and providing a recommendation that indicates a data source to add to the data model.

In some implementations, the method includes storing information about attributes and metrics from data sets in a vector database.

In some implementations, the method includes using the one or more AI/ML models and the vector database to determine whether portions of the one or more data sets represent attributes or metrics.

In some implementations, the method includes providing a list of column names to the one or more AI/ML models along with a description of metrics and attributes; and receiving, from the one or more AI/ML models, an indication of column names with a respective classification.

In some implementations, the method includes determining a vector representation for each of one or more columns of data of the one or more data sets; calculating the distance between the vector representations of the one or more columns and vector representations from the vector database; and based on the calculated distances, determining, for each of the one or more columns of data, at least one of: a type of data object corresponding to the column, a category or dimension represented by the column, or a semantic meaning of data in the column.

In some implementations, the method includes using the vector database to infer hierarchy relationships among columns or data objects of the one or more data sets, based on similarity to other data sets described by the vector database.

In some implementations, the method includes using the one or more AI/ML models to infer one or more relationships between columns of data in the one or more data sets.

In some implementations, the method includes, based on how columns with known properties and labels are grouped in the vector space of a vector database, using the similarity of vector representations of columns in the one or more data sets to the groupings in the vector space to infer properties of the columns of the one or more data sets.

In some implementations, generating the set of recommendations comprises determining one or more data preparation recommendations based on a set of stored data preparation rules that specify criteria for generating data preparation recommendations.

In some implementations, the method includes obtaining, from the one or more AI/ML models, inferred information for a portion of the one or more data sets including, for example, a semantic role, a data type, a data format, a delimiter used, or default action to perform when data is missing.

In some implementations, the set of recommendations comprises one or more recommended data preparation actions inferred to be appropriate for the one or more data sets, including at least one of: duplicate row removal, standardizing a temporal data format, enriching data by expanding an abbreviation, normalizing data, standardizing data, or filling in one or more missing values.

In some implementations, the set of recommendations comprises a recommendation for an aggregation level for data summarization determined based on characteristics of the one or more data sets.

In some implementations, the method includes performing automatic relationship detection and automatic relationship validation for relationships among data objects in the one or more data sets.

In some implementations, the set of recommendations comprises a data modelling recommendation comprising at least one of: creating a hierarchy or link between multiple data sets, creating a new relationship between multiple data objects, or associating data from the one or more data sets with an attribute or metric.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 2 to 9 are user interface diagrams illustrating examples of data preparation and modeling using artificial intelligence.

Like reference numbers and designations in the various drawings indicate like elements.

DETAILED DESCRIPTION

Figure 1A:
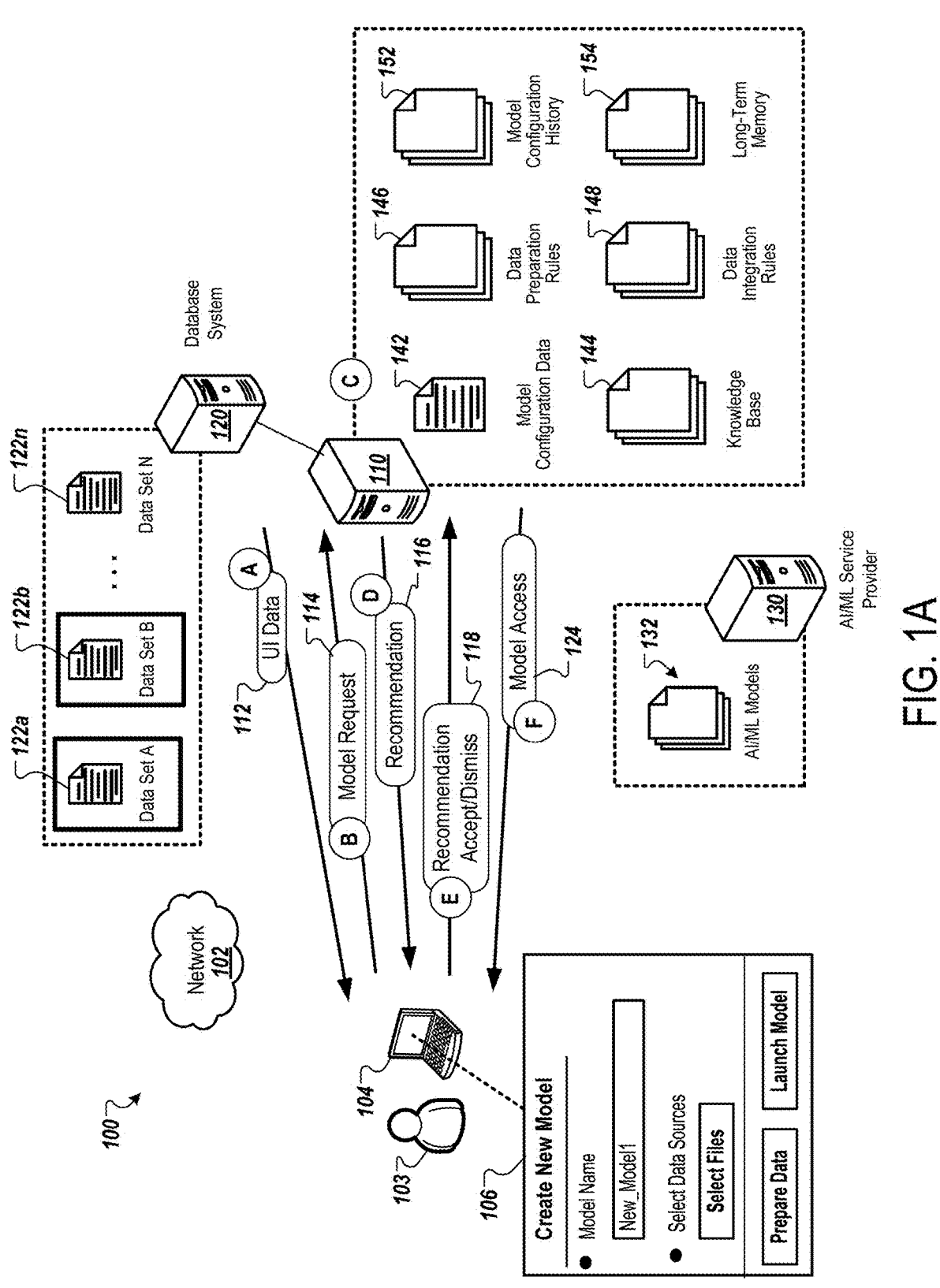
FIGS. 1A-1B and 10 are diagrams showing an example of a system for data preparation and modeling using artificial intelligence.
Figure 1B:
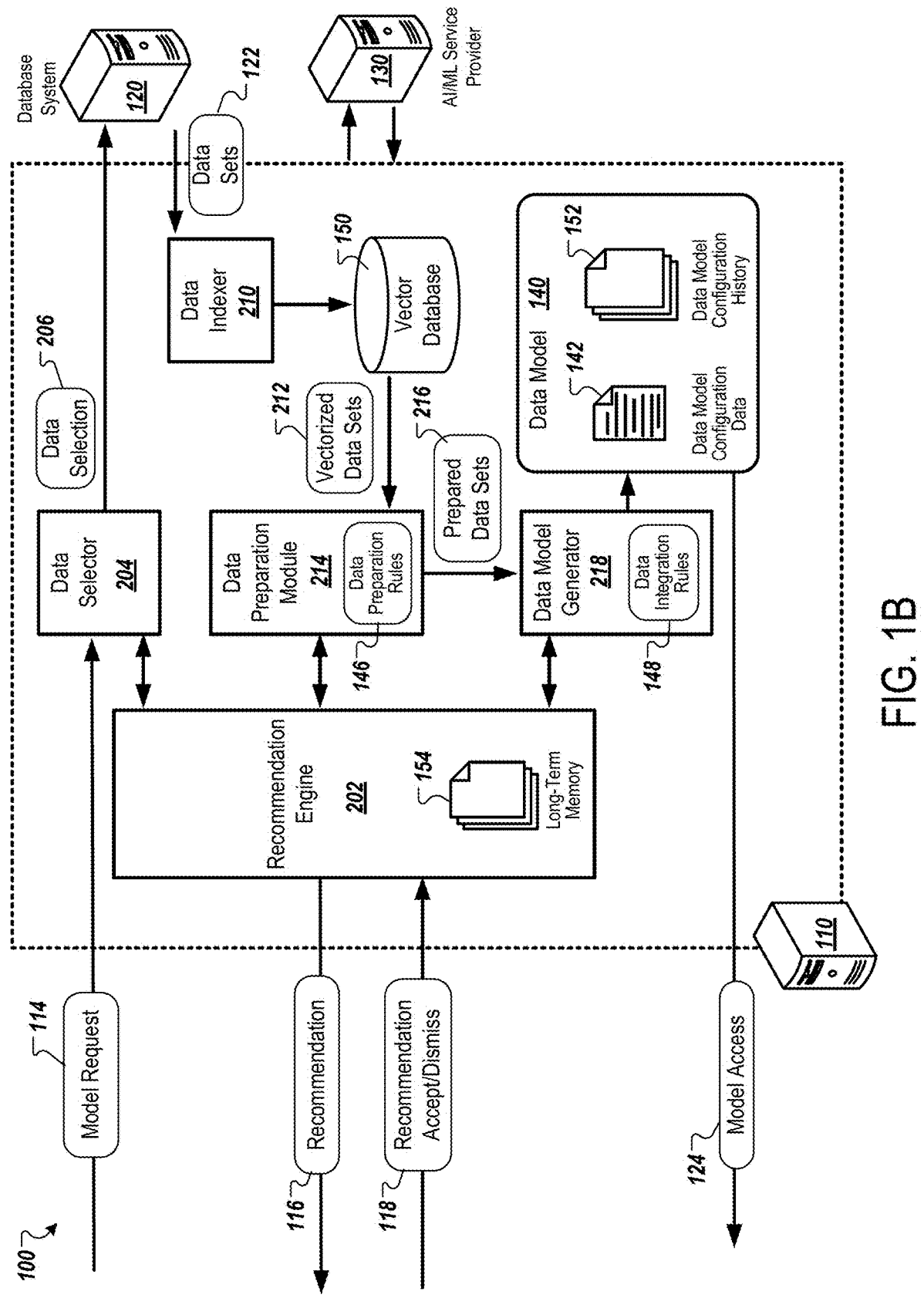

FIGS. 1A and 1B are diagrams showing an example of a system 100 for creating, distributing, and using interactive applications such as data models. The system 100 includes a computer system 110, a database system 120, and an AI/ML service provider 130. The elements of the system 100 communicate over a network 102, such as the Internet.

The computer system 110 coordinates a variety of functions for generating data models. For example, the computer system 110 interacts with a client device 104 of a user 103 to receive data that indicates a request for a data model. The computer system 110 then performs data preparation and data modeling actions while providing recommendations to the client device 104 for acceptance or dismissal by the user 103. The computer system generates the data model according to the user's response to recommendations, and provides access to the data model to the client device 104.

The example of FIG. 1A includes stages (A) to (F), which represent various operations and a flow of data, and which can occur in the order illustrated or in a different order. Stages (A) to (F) show an example of creation of a data model and access being provided to the user 103 via the client device 104.

The computer system 110 can be implemented using one or more servers, including one or more cloud computing systems. For example, the computer system 110 can be an application server. The computer system 110 provides front-end functionality to interface with various client devices. For example, the computer system 110 can provide an interface for creating and editing data models and other interactive applications that leverage AI/ML models. The interface can be an application programming interface (API), a user interface (e.g., by providing user interface data for a web page or web application), or another type of interface. As discussed further below, the computer system 110 performs various other functions to generate and save data models.

The database system 120 can provide various data retrieval and processing functions. For example, the database system 120 can be a database management system (DBMS), and can include the capability to process operations specified in structured query language (SQL), Python code, or in other forms. The database system 120 has access to various data sets 122a-122n, which can be private data sets for organization, such as a company. The database system 120 can store and use data sets in any of various forms such as tables, data cubes, or other forms. The data sets can include, for example, .csv files, .xlsx files, unstructured data, data from SaaS platforms (e.g., Shopify, Google analytics), cloud sources (e.g., Snowflake, Databricks, Redshift), or any combination thereof.

The AI/ML service provider 130 can be a server system or cloud computing platform that provides access to one or more AI/ML models 132, such as LLMs. The computer system 110, the database system 120, and the AI/ML service provider 130 may be implemented as separate systems or may be integrated in a single system. For example, the AI/ML service provider 130 can be a third-party service or can be managed and operated by the same party as the computer system 110 and/or the database system 120.

As an overview, to create a data model, the user 103 interacts with the computer system 110 to specify the features and behavior that are desired for the data model.

Through a series of interactions, the user 103 can specify characteristics such as which data set(s) 122a-122n will be incorporated into the data model. The computer system 110 assists in creating the data model by, for example, providing recommendations for relationships to establish, updates to metadata, data cleansing operations, and so on. The user 103 can accept these recommendations to cause the corresponding changes to be made to the data model (or to the underlying data set if appropriate). The computer system 110 saves the settings specified by the user 103 and creates the data model.

In this process, the user is also assisted by artificial intelligence models through a chatbot interface, in which the user can enter instructions or other user prompts. For example, the user can instruct the chatbot, "create a metric profit as sales price minus cost." Using the context of the current data sets that have been specified by the user 103 to be described by the data model, the chatbot can detect that a new metric should be created, that the name of the new metric should be "Profit." The chatbot can provide output that the computer system 110 interprets or acts on to create a metric with this name. In addition, the computer system 110 can provide the AI model for the chatbot (e.g., an LLM) information about the data sets that are described by the data model being edited or created, e.g., information such as the names of columns, descriptions or labels for the columns if present, and sample data or a data format to indicate the type of data present in the various columns. From this, the AI model can infer which columns represent "sales price" and "cost" respectively, and the AI model can define the new metric "Profit" to be the difference between the values in the "sales price" and "cost" columns. The computer system 110 can save this metric definition for later use. In addition, in response to the generation of the metric using the AI model, the computer system 110 can present the metric as defined, e.g., with a formula or equation showing how the metric is defined, in the user interface so the user 103 can view the metric definition and verify it or edit the definition if desired.

The computer system 110 supports many different types of modeling functions to be performed in response to user prompts through the chatbot interface, including: adding or editing metrics, attributes, or other data objects; changing names or descriptions; adjusting relationships among data objects; and so on.

The computer system 110 can then publish the data model, such as by making it available to database systems, artificial intelligence chatbots, dashboards, and other software programs. In many cases, the data model assists chatbots and various types of software applications to interpret the semantic meaning of data and to identify relationships among data from different sources (e.g., different tables, different data sets, etc.). For example, a data model often specifies the various of data objects (e.g., attributes, metrics, facts, etc.) that are available in one or more data sets, and the location in the data sets where the corresponding data can be found (e.g., a particular column of a particular table). In addition, for each data object, the data model can indicate a data type (e.g., integer, Boolean value, email address, street address, city, customer identifier, etc.) for data of that data object, an identifier for the data object, a description for the data object, and relationships to other data objects. This information assists software, including database systems, data viewers, artificial intelligence chatbots, and other systems to appropriately make use of the different data objects.

To provide the interface, the computer system 110 can provide data for a web application, web page, or native application that, when rendered on the client device 104, provides the functionality to create or edit a data model.

In stage (A), the computer system 110 provides user interface data 112 to the client device 104 over the network 102. For example, the computer system 110 can provide content of a web page or web application for creating or editing the data model. The user interface data 112 is rendered on the display of the client device 104, represented by a user interface 106.

The user interface 106 provides controls to specify different properties of the data model. For example, the user interface 106 enables the user 103 to specify the data sources and/or data sets that will be included in the data model. The user interface 106 can include a chatbot interface that enables the user 103 to give instructions for data modeling actions or specify requested attributes of the data model using natural language text prompts.

In stage (B), the user 103 uses the interface 106 to enter a request for a data model. The client device 104 sends the data model request 114 to the computer system 110 over the network 102. For example, the request may be made by a user clicking an on-screen control to create a new data model, or the user entering a prompt through a chatbot interface to "create a new data model."

As an example, the user 103 selects particular data sets 122a and 122b and selects a control, such as a button or an option from a context menu, to indicate that these data sets 122a-122b should be included in the data model. As a result, the computer system 110 will generate a data model from the data sets 122a and 122b.

The process of specifying settings for the data model can be iterative, with potentially multiple rounds of the user 103 interacting with the user interface 106 to incrementally adjust and test the settings of the data model.

FIGS. 2-9, discussed further below, show examples of the user interface 106 and further illustrate the types of settings or characteristics that can be adjusted to customize the data model.

Referring still to FIG. 1A, in stage (C), in response to the data model request 114 from the user 103, the computer system 110 determines recommendations for generating the data model.

The computer system 110 can include a number of modules and data sets that facilitate the generation of new data models. For example, the computer system 110 can include a set of data preparation rules 146 that provides rules for preparing data for integration into a data model. The computer system 110 can include a set of data integration rules 148 that provides rules for integrating multiple data sets into a data model.

Referring to FIG. 1B, the computer system 110 includes a recommendation engine 202, a data selector 204, a data indexer 210, a data preparation module 214, and a data model generator 218. The computer system 110 generates and stores a data model 140. The data model 140 includes model configuration data 142 and model configuration history 152. In general, the computer system 110 accesses AI/ML models 132 provided by the AI/ML service provider 130 and generates the data model according to the data model request 114.

Components of the computer system 110 can be provided as one or more computer executable software modules or hardware modules. That is, some or all of the functions of components of computer system 110 can be provided as a block of computer code, which upon execution by a processor, causes the processor to perform functions described below. Some or all of the functions of components of the computer system 110 can be implemented in electronic circuitry, e.g., by individual computer systems (e.g., servers), processors, microcontrollers, a field programmable gate array (FPGA), or an application specific integrated circuit (ASIC).

Components of the computer system 110 can include one or more machine learning models and/or can access one or more machine learning models. For example, components of the computer system 110 can access AI/ML models 132 hosted by the AI/ML service provider 130. In some implementations, components of the computer system 110 include machine learning models. For example, the recommendation engine 202 can include one or more machine learning models that is trained to prioritize recommendations. The recommendation engine 202 can learn recommendation prioritization over time based on receiving acceptances and dismissals 118 of recommendations 116. In some implementations, the recommendation engine 202 can be trained using data in the long-term memory 154 that indicates which recommendations have been accepted and dismissed.

In stage (D), throughout the process of generating and editing the data model 140, the computer system 110 provides recommendations 116 to the client device 104. The recommendations 116 can include, for example, recommended data sources, formatting, relationships, labels, and so on.

In stage (E), throughout the process of generating and editing the data model 140, the computer system 110 receives data indicating acceptance or dismissal 118 of the recommendation 116. The computer system 110 edits the data model 140 based on acceptance and dismissal 118 of recommendations 116 by the user 103.

When the computer system 110 receives the data model request 114, the data selector 204 outputs a data selection 206 to the database system 120. The data selection 206 can include a list of tables that are to be imported and integrated into the data model 140. The data selector 204 can determine the data selection 206 based at least in part on the data model request 114. In some implementations, the data selection 206 includes tables that were specified by the user 103 in the data model request 114.

In some implementations, the data selection 206 includes tables that are identified by accessing the AI/ML models 132. For example, the computer system 110 can provide information from the data model request 114 to the AI/ML models 132, and the AI/ML models 132 can identify recommended data sources for importation into the data model 140.

In some implementations, the AI/ML models 132 can analyze user behavior and data usage patterns to recommend the most relevant data sets and data models, facilitating quicker and more relevant data discovery. In some implementations, the AI/ML models can search through existing data repositories using natural language queries to find data sets and models that match the user's analytical needs, as specified in the data model request 114.

In some implementations, the recommendation engine 202 outputs a recommendation 116 indicating the recommended data sources to the client device 104. A list of the recommended data sources can be presented to the user 103 through a user interface displayed by the client device 104.

The user 103 can interact with the user interface to accept or dismiss 118 the recommendation 116 to add a data source, such as a table, to the data model 140. In response to the user accepting a recommendation for importing a data table, the data table can be added to the data selection 206. In response to the user dismissing a recommendation for importing a data table, the data table can be omitted from the data selection 206.

A data indexer 210 the data sets 122 specified by the data selection 206 into the computer system 110. In some implementations, the data indexer 210 performs normalization on the data sets 122 in order to standardize the data.

In some implementations, the data indexer 210 puts attributes and metrics from the data sets 122 into a vector database 150. The data indexer 210 can access the AI/ML models 132 in order to determine whether each entry represents an attribute or a metric, and/or to vectorize the names of columns in the data sets 122. For example, the data indexer 210 can provide a list of column names to the AI/ML models 132 along with a description of metrics and attributes. The AI/ML models 132 can output the list of column names with a respective classification as a metric or an attribute.

In some implementations, the data indexer 210 determines a hierarchy of data in the data sets 122. For example, the data indexer 210 can define relationships between columns, such as a "one-to-many" relationship. The vector database 150 can store data representing columns (e.g., the type of data in the column, the name or label of the column, and so on) and relationships between columns. By representing columns or other data in a vector space, the computer system 110 can assess similarity of the concepts or data represented by the columns. Based on how columns with known properties and labels are grouped in the vector space, the computer system 110 can use the similarity of new columns in new data sets to the groupings to infer properties of the new columns. The computer system 110 can also use the vector database to infer relationships among columns.

The data preparation module 214 accesses vectorized data sets 212 from the vector database 150. The data preparation module 214 performs data preparation in accordance with the data preparation rules 146. In some implementations, the data preparation rules 146 specify criteria for generating a data preparation-related recommendation. For example, criteria can specify a threshold difference that defines outlier values. The data preparation module 214 can therefore identify outliers by comparing a value difference to the threshold difference. When the criteria is satisfied, the data preparation module 214 outputs a recommendation 116 through the recommendation engine 202.

Data preparation can include data cleansing and data wrangling. In general, data preparation can include identifying gaps in data and either filling or deleting them, deleting data that is unnecessary or irrelevant, identifying outliers and explaining the discrepancies or removing the outliers, enriching data, and correcting errors.

In some implementations, the data preparation module 214 uses the AI/ML models 132 to identify recommended preparation actions. The data preparation module 214 outputs recommended actions to the recommendation engine 202. The recommendation engine 202 provides the recommendation 116 to the client device 104 and receives a response indicating acceptance or dismissal 118 of the recommendation 116.

In an example, the data preparation module 214 sends sample data from the vectorized data sets 212 to the AI/ML service provider 130. The AI/ML service provider 130 provides, to the data preparation module 214, information such as inferred semantic roles, data type, format, delimiter, and default action for missing data. The data preparation module 214 can process the vectorized data sets 212 according to the data preparation rules 146 and the data roles identified by the AI/ML models 132.

In some implementations, the data preparation module 214 performs data preparation actions without requesting approval from the user 103. The data preparation rules 146 can specify which data preparation actions are performed automatically, and which actions are output by the recommendation engine 202 for approval by the user 103.

Data preparation actions can include, for example, duplicate row removal, standardizing date, time, and other temporal data formats, enriching the data by expanding abbreviations to full words, normalizing data, using clustering, embedding, and similarity analysis for standardization, and filling in missing values. Data preparation can include editing attributes and metrics of the vectorized data sets 212. The data preparation module 214 can use the AI/ML models 132 to scan for data entry errors, outliers, and inconsistencies, and to suggest corrections based on learned data patterns and rules. Outliers can be identified based on statistical distributions and contextual analysis. The data preparation module 214 can determine whether to exclude, adjust, or investigate any anomalies further.

The data preparation module 214 can suggest aggregation levels for data summarization, tailored to the user's analysis goals, as specified through the data model request 114 and any other input received from the user 103. The aggregation levels can be based on the data set characteristics. The data preparation module 214 can use the AI/ML models 132 to sort data in an order based on user preferences, past behaviors, and data relationships.

The data preparation module 214 can track and log data preparation steps, enabling duplication, validation, and auditing. The data preparation module 214 outputs prepared data sets 216 to the data model generator 218.

The data model generator 218 generates the data model 140 from the prepared data sets 216 in accordance with the data integration rules 148. In some implementations, the data integration rules 148 specify criteria for generating a data modeling-related recommendation. When the criteria is satisfied, the data model generator 218 outputs a recommendation 116 through the recommendation engine 202.

Generating the model can include performing automatic relationship detection and automatic relationship validation of the prepared data sets 216. The data model generator 218 can use the AI/ML models 132 to integrate the data sets by combining and correlating data between the data sets.

In some implementations, the data model generator 218 uses the AI/ML models 132 to identify recommended data modeling actions. The data model generator 218 outputs recommended actions to the recommendation engine 202. The recommendation engine 202 provides the recommendation 116 to the client device 104 and receives a response indicating acceptance or dismissal 118 of the recommendation 116.

In some implementations, the data model generator 218 performs data modeling actions without requesting approval from the user 103. The data integration rules 148 can specify which data modeling actions are performed automatically, and which actions are output by the recommendation engine 202 for approval by the user 103.

Data modeling actions can include creating hierarchies and links between data sets and creating new relationships between data objects. For example, the data model generator 218 can use the AI/ML models 132 to automatically infer relationships among data sets such as parent-child relation-ships between attributes and relationships between columns. Data modeling actions can include associating data with attributes and metrics.

The data model generator 218 can use the AI/ML models 132 to cleanse object names by analyzing naming patterns and suggesting standardized nomenclature. The recommendation engine 202 can then output a recommendation 116 to rename object names in order to standardize the object names and increase consistency across the data model. The data model generator 218 can provide recommendations for changing names of labels, attributes, attribute classes, and metrics.

The data model generator 218 can use the AI/ML models 132 to combine attributes that have multiple forms into a single attribute with multiple expressions. The data model generator 218 can use the AI/ML models 132 to automatically detect and build time dimensions by analyzing date fields, recognizing patterns, and suggesting time hierarchies such as days, weeks, months, quarters, and years.

The data model generator 218 can use the AI/ML models 132 to identify which metrics should be aggregated, and which metrics should not be aggregated, in order to maintain data integrity across the data model.

The data model generator 218 can use the AI/ML models 132 to recommend appropriate aggregation functions for each metric based on the data distribution and the nature of the data points.

The data model generator 218 can use the AI/ML models 132 to set metric formatting. The data model generator 218 can automatically format metric numbers based on regional settings and data semantics, such as setting currency symbols and decimal point conventions.

The data model generator 218 can use the AI/ML models 132 to set join types between tables, create partition mapping tables for defining unions, and map the prepared data sets 216 to attributes from certified models.

The data model generator 218 can use the AI/ML models 132 to recognize and assign geographical attributes to data points, facilitating location-based analysis and visualization, and to generate descriptive metadata for data sets based on content analysis and usage patterns.

As described above, the computer system 110 access the AI/ML models 132 provided by the AI/ML service provider throughout the data selection, data preparation, and model generation processes. The AI/ML models 132 can be supplemented by additional information such as data stored in a knowledge base 144 and/or a long-term memory 154.

The knowledge base 144 can be provided to assist the computer system 110 in interpreting data sets with the terminology for the user's organization. In general, the knowledge base 144 can function to provide contextual knowledge to the AI/ML models 132, so the models can classify and use the appropriate nomenclature when evaluating associations between data objects.

Organizations or departments may use terms that have a special contextual meaning, or are not part of general language, and so would not be available for training of an LLM. For example, a company may internally use various names for its products, projects, teams, locations, policies, initiatives, organizational structure, and so on. For example, a company be developing a product with a codename that is specific to the company and not referenced in public documents. To enable the AI/ML models to infer relationships between data sets, the knowledge base 144 can be designated to describe these and other internal terms. Each time the computer system 110 generates a prompt, the knowledge base 144 can be provided to assist the LLM with the context that is appropriate for the company. The knowledge base 144 can provide information similar to a semantic graph, by describing entities and their relationships. In some cases, the information in the knowledge base 144 can be derived from a semantic graph and then converted into text (e.g., unstructured, semi-structured, or structured) in a format that can be processed by the LLM.

In general, the knowledge base 144 or other additional data set can include data that maps terms or phrases to their meanings. In many cases, this can include semi-structured data or explanatory content, as a way to explain entities and relationships to the AI/ML models 132. Although the knowledge base 144 may include definitions, more generally the information may include descriptions of people, roles, business units, products, and other terms that may be referenced.

The knowledge base 144 can improve consistency for many data sets used within an organization. The computer system 110 automatically includes the knowledge base 144 in its context for each submission to the AI/ML models 132.

In addition, the knowledge base 144 provides persistent context that is not lost from one prompt to another or from one session to another. The knowledge base content can also be implemented applied in a manner that the knowledge base 144 does not count toward the instruction token limits that the AI/ML models 132 consume for each response. Rather than counting toward the tokens for prompts and recent history, the knowledge base 144 can be accessed or provided to the AI/ML models 132 as a separate source of knowledge apart from the prompt and context, and so does not count toward the token limits of an LLM. Implementations of access to the knowledge base 144 can vary. In some cases, the knowledge base 144 can be prepared as an embedding, a vector database, or other format that can be accessed by or referred to by the AI/ML models 132.

In some implementations, the knowledge base 144 can be implemented in a retrieval augmented generation (RAG) process. A RAG process can improve the efficiency of AI/ML applications by leveraging custom data. This can be done by retrieving data, documents, and/or portions of documents and providing them as context for the AI/ML models. In some implementations, the retrieved data is appended to queries submitted to the AI/ML models. A RAG workflow pulls relevant information and connects static AI/ML models with real-time data retrieval, instead of relying solely on knowledge derived from the training data.

In some implementations, the computer system 110 has a long-term memory 154, which can store information learned from users in past interactions. For example, LLMs and other AI/ML models 132, on their own, are generally stateless and do not natively understand the user context or history of interactions with the user, especially from previous sessions. The long-term memory 154 can facilitate learning by the data selector 204, the data preparation module 214, the data model generator 218, and/or the model recommendation engine 202. For example, the long-term memory 154 can store items such as definitions of terms for a particular user context and feedback from prior user interactions.

Using the long-term memory 154, the recommendation engine 202 can learn and adapt from explicit or implicit user feedback over time. When the recommendation engine 202 provides a recommendation 116, and the user 103 accepts or dismisses 118 the recommendation, then the computer system 110 can capture that feedback and update the recommendation engine 202 to improve future recommendations. For example, the computer system 110 may add or adjust settings of the recommendation engine 202 to reflect the user preferences. In some cases, this may include adding rules that are context-dependent. In some implementations, the recommendation engine 202 includes one or more machine learning models and the recommendation engine 202 can learn over time which recommendations are likely to be accepted by the user 103. The recommendation engine 202 can prioritize recommendations that are likely to be accepted over other recommendations that are less likely to be accepted by the user 103.

The learning of the recommendation engine 202 is managed by the computer system 110 and happens on an ongoing basis as users interact with the recommendation engine 202. The information learned is stored outside the LLM or other AI/ML models 132, and is stored in the long-term memory 154 designated for the recommendation engine 202.

The preferences of an individual user may be learned and applied for that user. In addition or instead, the aggregate preferences learned for many users can be combined to adjust the recommendation engine 202, to accelerate the adaptation of the recommendation engine 202 to meet the needs of the user base.

The data model generator 218 generates the data model 140. The computer system 110 saves the data model 140 including the model configuration data 142. The computer system 110 can also save model configuration history 152 in order to track updates made to the data model 140 over time. Saving the model configuration history 152 can enable the user 103 to roll back changes that are made to the data model 140. In some implementations, the data model 140 is connected to a chatbot. The chatbot can be configured to respond to queries about the model.

At stage (F) the computer system 110 provides access 124 to the data model to the user 103. The computer system 110 provides access to the data model to authorized users in any of various ways. For example, the computer system 110 can send a message to authorize users with a URL or other link to web page, web application, or native application functionality providing the data model interface. As another example, the computer system 110 can update and interface such as a document library, dashboard, or other user interface to include a representation of the data model. The client device 104 can provide to the user a tabular view of all available tables, displaying their interrelations through common attributes.

In some implementations, the data model 140 is used by an AI chatbot to interpret and to respond to user prompts. The user 103 can submit queries to the chatbot through the client device 104, and the chatbot can execute the queries using the data in the data model 140, and provide the query responses to the user 103 through the client device 104. For example, the information in the data model 140 can enable a LLM or other artificial intelligence model to identify the data objects that are available for answering a user's question, and to map terms or concepts in a user's question to specific data objects. This enables the LLM to provide generated text that references data objects with the identifiers (e.g., names, column identifiers, metric identifiers, etc.) that are accurate and precise, so that the LLM can generate, for example, code or instructions (e.g., Python code, structure query language (SQL) code, etc.) that correctly references actual data objects described by the data model 140 that also have the semantic meaning intended by the user 103.

The computer system 110 can use various techniques for generating recommendations for data modeling actions. For example, the computer system can store a variety of rules patterns, and pre programmed algorithms to detect various conditions of datasets that may need to be adjusted. For example, validation rules can be stored to verify whether relationships among data elements have appropriate properties and consistency. Similarly, normalization rules can specify how different types of values are adjusted or normalized. As another example, formatting rules forward date formats, phone number formats, address formats, and formats for other types of data can be defined and used by the computer system 110. For these types of changes to data sense, the computer system can store predetermined scripts, templates, code segments, or other content to perform various actions. When the conditions for recommending or performing an action are detected, the system 110 can retrieve the corresponding script, which includes interpretable or executable content, and the computer system 110 can in search data to populate fields of the retrieved script.

In many cases, data modeling includes creating a metadata object, or group of metadata objects, that represent the logical and semantic characteristics of a data set. This includes creating logical objects, such as attributes and metrics. As part of the process, the computer system 110 can perform mapping of logical objects to stored data. For example, the system can determine that a particular column of data represents A dimension or attribute with which sorting, filtering, and other operations can be performed. The data modeling process can create a metadata object that labels the attribute, designates the type of object present, maps the object to a column of a table and a data set, and provides other information needed for chat bots and other functionality to access that data. Similarly, the system can identify and define metrics, which can be numerical values or other types of values on which calculations and other operations can be performed. As with attributes, the computer system 110 can store metadata that specifies the nature of each metric discovered in an imported data set, such as the data type, the semantic meaning of the data or what the data represents, a natural language label for the metric, a mapping of the metric to a column of a table of a data set, and other information that allow a data processing system or chatbot to utilize that metric.

In many cases, logical objects include types of data that may not be directly stored in a data set, but which can be derived from the data set by applying an operation to the stored data. For example a derived attribute or derived metric can be one that, although not directly stored, can be calculated by applying one or more operations to one or more columns or other sets of data in a data set. The computer system can generate derived attributes and derived metrics automatically or recommend that these be generated. For example, after identifying a metric for sales and a metric for costs, the computer system 110 can generate a derived metric of profit, which is calculated by subtracting the value of sales from the value of costs. Discussed further below, the computer system can learn which derived attributes and derived metrics to recommend or generate in various ways, including based on predetermined rules, based on usage data showing frequently performed actions of users, or based on output of machine learning models.

In some cases, rules or heuristics can be used to assess the type of data present in a column of a data table, and thus what type of label and semantic meaning is appropriate for that column. For example, the computer system 110 can perform a sampling of data from a column, taking the first 100 or 1000 rows of data to examine, and compare the set of values and format with known characteristics to predict a likely label and meaning of the data. However, predetermined rules and formulas are often limited in the variety of conditions they detect, and also may not respond to changes in usage over time. As a result, machine learning models such as LLMs and associated vector databases can provide better performance in a wider range of conditions.

For example, the computer system 110 can store information about logical objects and data set components in the vector database 150 so that information about many different data elements are stored in a vectorized format in a high dimensional vector space. For example, the vector database 150 can include information about many columns of different databases, with corresponding labels that specify whether the columns are metrics or attributes and also the class or category (e.g., time, geography, names, etc.), as well as the specific meaning of the data (e.g., phone number, address, profit, sales, product identifier, etc.). When a user is creating a new data model for a new data set, the computer system 110 can determine the vector representation for each new column and calculate the distance between the columns vector representation and the vector representations of the other columns. For example, a column that includes date information will often be near the vector representations of other date-containing attribute columns. Based on the similarity or the closeness of the new column to the known date columns in the vector space, the computer system 110 can determine with high confidence that the new column represents an attribute. The computer system 110 can also determine that the new column is very likely to be time related and is likely to represent date information.

As another example, the computer system 110 can use an LLM or other AI/ML model and ask the LLM to categorize the column. This can include providing sampled data or synthetic data generated based on a column to the LLM. In some cases, providing sampled or derived synthetic data from multiple columns can provide better context for the LLM to infer the types of data present and relationships among the data. However, LLMs by their nature are not perfectly accurate, and so the computer system 110 can perform validation checks of categorizations from LLMs to detect and avoid use of hallucinations by the LLMs. For example, the inferences from an LLM about the meaning of a column can be compared and checked with the predictions determined using the vector database similarity check, to provide a hybrid or combined approach.

The computer system 110 can also be configured to perform hierarchy detection, such as setting up parent-child relationships and other relationships among attributes or other data elements. In many cases, these are one to many relationships later, when users attempt to use the imported data to perform reporting or analysis with SQL statements, the generated SQL statements can be optimized if the relationships are known and specified in the data model. If no relationship is defined, then the system may need to assume that a cross join is needed. However, if a one to many relationship is known, a data processing system can optimize the join path for faster and more efficient processing, as well as potentially more accurate results.

To determine hierarchy information, the computer system 110 can first identify a relationship table to use. The relationship table is often one that defines a one-to-many mapping between certain columns, such as year ID and month ID. Sometimes a fact table includes columns from different hierarchies (e.g., a time hierarchy, geography hierarchy, year ID, day ID, country ID, etc.), and even though the columns exist together in one table, it may not necessarily be able to serve as a relationship table.

As a result, the computer system 110 first attempts to identify whether there is a one-to-many relationship between two attributes, And if so, the computer system tries to identify a relationship table that specifies the relationship so that relationship table can be used to reliably join the attributes together. In many cases, an LLM can be used in this process, for example, LLMs often have a strong ability to correlate relationships in time and geography. The process can involve more steps for other types of data, such as for users own specific hierarchies (e.g., internal project names, product names, product families, an so on). For these situations, the computer system can use the vector database approach discussed above to examine not only individual columns but combinations of columns and datasets as a whole to determine similarities among them, and then infer hierarchy relationships to be present in the new data set similar to the previous data sets having the closest similarity to the new data set. In many cases, where an enterprise has a variety of data models or database schemas already that can be entered to the vector database 150 and used as examples, the computer system 110 can use those relationships and similarities with high accuracy to predict relationships among new datasets, especially where there is overlap in the types of data used and overlap in values for at least some attributes.

As another example, LLMs can be used more effectively using retrieval augmented generation (RAG), where the computer system 110 uses a select set of data that acts as a short term memory to supplement the knowledge of the LLM, at the computer system 110 feeds the select set along with instructions to classify or infer relationships among new data sets. For example, when creating a data model for a newly imported data set, the computer system can use sampling and comparisons of data with previously imported and modeled datasets for an organization period from this, the computer system 110 can identify data models and object hierarchies corresponding to those datasets having similar properties or similar contents. This can include retrieving data that is similar from the vector database 150, where the information is similar in semantic meaning or concept even if not an exact match on the values. The computer system can provide the retrieved information with information about the new data set to an LLM, along with an instruction to infer information about the data set, such as whether certain bit elements represent attributes or metrics, what those attributes are metrics represent, and what the relationships among them are (including the nature as one to one, one to many, or many to many). In combination with validation checks on sample data, the computer system 110 can reliably infer many data modeling characteristics with these techniques.

The computer system 110 can provide its data modeling tool with an interface that can be used for users of various different skill levels, from data architects and data scientists who are very experienced to everyday users who may not otherwise know how to manually prepare, cleanse, and model data. There are many entry points for the data modelling interface, such as a drop down menu item from a File Manager or object library. As another example the data modeling may begin when a user adds a new data set or invoke the context menu for a data set. As discussed below, the data modeling interface can include a sidebar that is populated with specific recommendations for cleaning data, updating relationships and metadata in the data model, and so on. As the computer system identifies recommended data preparation actions and data modeling information, new recommendations are populated to the sidebar. Users have the option to select individual recommendations and view additional details of the change (e.g., to see how many records would be affected; to view the particular logical objects involved; to see the script, Python code, SQL statement, or other code involved; etc.) and to view a preview of the results that would be achieved by accepting the recommendations.

Over time, as users interact with the recommendations of the computer system 110, the computer system 110 learns which recommendations are most likely accurate in future situations. For example, when users accept a particular type of recommendation, such as to link attributes having certain properties together, the computer system 110 can track that acceptance and incrementally increase the confidence score that the action is appropriate for those circumstances. On the other hand, when users dismiss a recommendation without applying it, or apply recommendation and then reverse it, the computer system 110 can penalize that change or decrease the its confidence score or relevant score in those situations in the future. As a result, as users use the system, it learns their preferences and fine tunes the recommendations accordingly.

In general, when a user selects or uploads a data set for data modeling, the computer system 110 can attempt to create a data model for each table and/or for a collection of data that spans multiple data tables or data sources. The interface can show the user a logical view of elements in the data set or a physical view representing how the data is actually stored. The system can provide recommendations in various categories including wrangling data (which can include cleaning, regularizing, standardizing data etc.) and identifying or managing relationships among the data (e.g., Specifying unions, joins, creating attributes, creating metrics, and so on. After a user loads data, the user interface can show information about each of the tables, including how and where they are linked, where the data is sourced from, and the recommendations for each table. For example, when a user selects a table or a data source, the recommendation area can be populated with the recommended operations for that data source or data set.

In the modeling process, the computer system 110 can enable the user to ask questions about the recommendations or the data set using a chat bot interface. In addition, the system can allow user to specify commands or changes to a data set or data model through the chatbot interface. For example, a user can ask a chatbot to create a metric, "create a metric Discounted Price" or ask to create an attribute, "create an attribute 'Customer Age.'" The LLM will infer columns representing the terms in the request, based on the data in the columns, labels of the columns, and the inference techniques discussed above. In many cases, the LLM or the computer system 110 can also determine the equation to be applied in calculating a metric. The results can be displayed to the user for verifying or editing the proposal from the LLM.

The computer system 110 can be used to perform data discovery on behalf of a user. This can include finding the information (e.g., among various data sources or data sets of an enterprise), modeling the information (e.g., setting up the foundation for the model by defining attributes, metrics, and links between them), and making recommendations for preparing the data. Some implementations, in a first pass of processing the computer system 110 identifies attributes and metrics. The computer system 110 can also determine attribute forms, which can be a higher-level construct that includes related attributes associated with a data object. Process, the computer system 110 can provide the user options to change the scope of data available through the model. For example, a user may search for column and decide to exclude one or more columns. As another example, the user may specify limits to enforce governance and policies that set boundaries about where AI/ML chat bots and other functionality can access.

FIGS. 2-9 illustrate various user interfaces for requesting, preparing, generating, updating, launching, and using data models. The user interfaces can be presented by a display such as a display of the client device 104 of the system 100.

Figure 2:
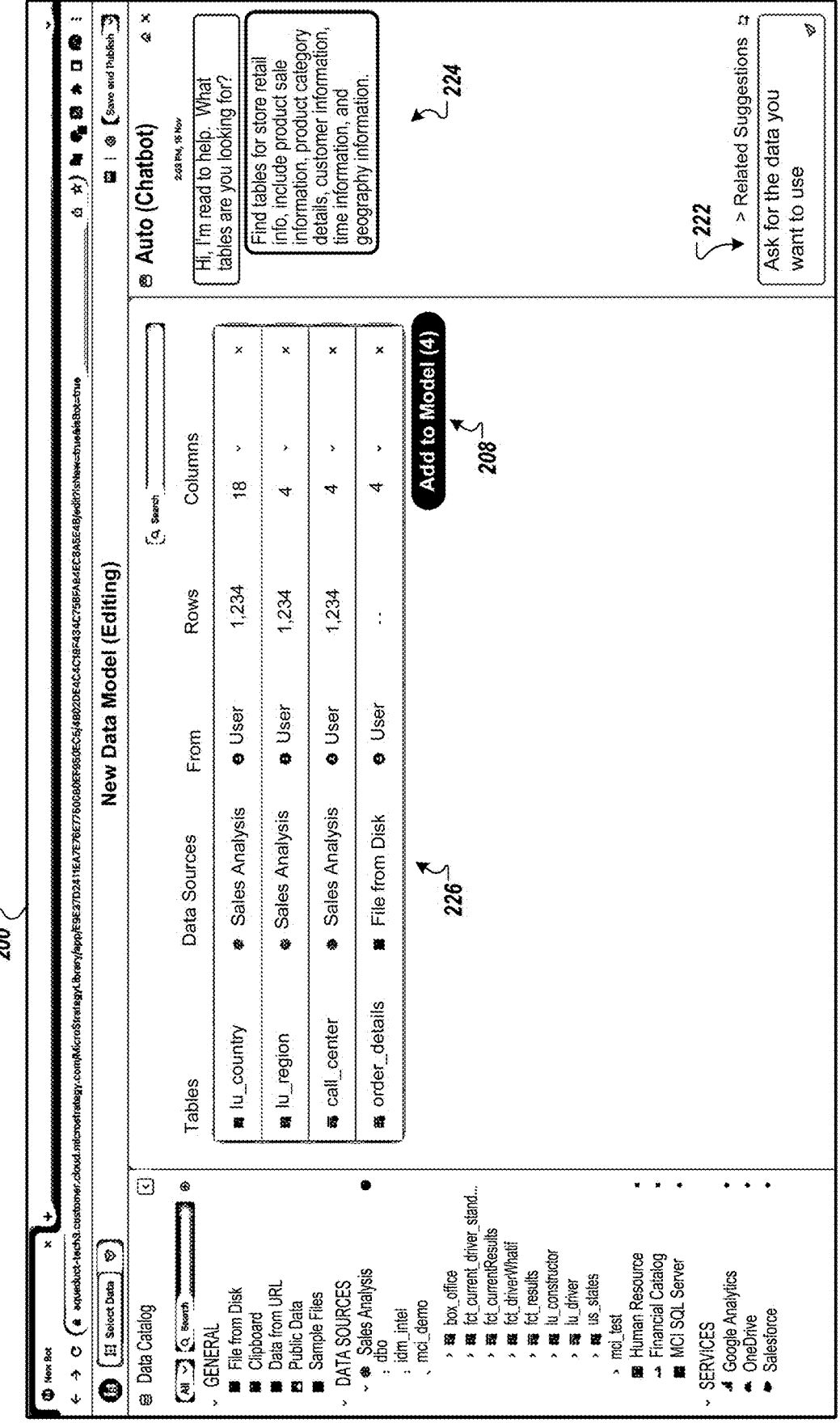

FIG. 2 shows an example user interface 200 that the user 103 can use to initiate automatic generation of a data model. The user interface 200 includes a field 222 in which a user can enter a request 224 for a data model. In response to receiving the request, the system searches for data sets that are relevant to the request. The user interface 200 displays results to the request in the form of a list 228 of data sets. The user interface 200 includes a control 208 that enables the user to add data sets from the list 228 to the data model. The user can add data sets to the data model individually by selecting an individual data set from the list 228, or as a group by selecting all of the data sets in the list 228.

Figure 3:
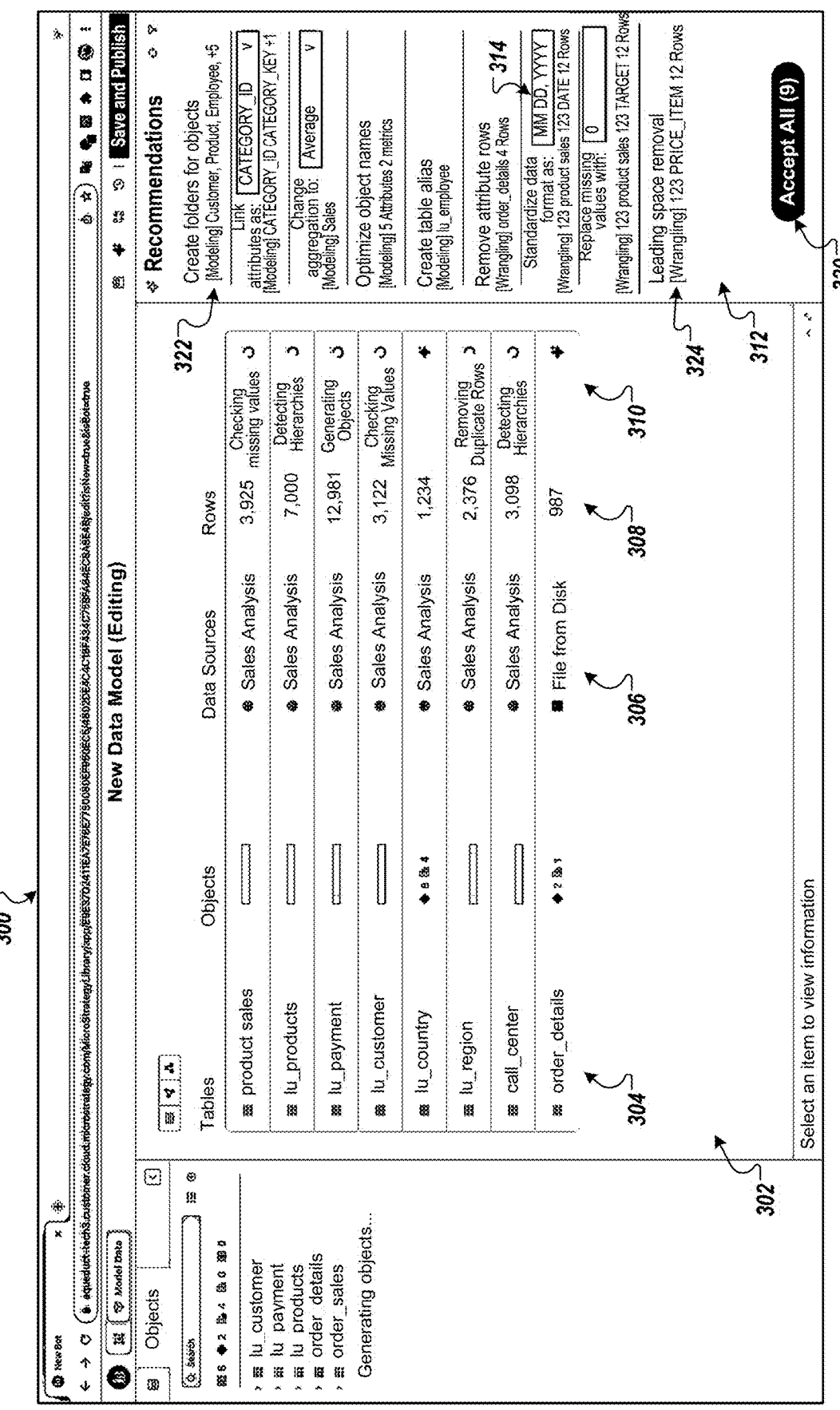

FIG. 3 shows an example user interface 300 for data set importation, processing, and recommendations. The user interface 300 includes a panel 302 showing a list of tables 304 that are being imported to the data model. For each table 304, the panel 302 shows a respective data source 306, size 308, and status 310. The status 310 indicates a status of integrating the table 304 into the data model.

The interface 300 includes a panel 312 that shows a list of recommendations for integrating the tables into the data model. The recommendations include creating folder or objects, linking attributes, changing aggregation, optimizing object names, creating a table alias, removing duplicate rows, standardizing a data format, replacing missing values, and removing leading spaces.

Each recommendation can be labeled as a "Modeling" recommendation 322 or as a "Wrangling" recommendation 324. A modeling recommendation 322 is a data modeling-related recommendation such as a recommendation generated by the data model generator 218. A wrangling recommendation is a data preparation-related recommendation such as a recommendation generated by the data preparation module 214.

In some cases, a recommendation includes a user input field. The user input field can include a drop down menu or a text input field. For example, the recommendation "Standardize date format as" includes a drop down menu 314 listing various date formats. To standardize the date format, the user can choose a selection from the drop down menu 314, select "Standardize date format as," and select control 320 in order to accept the recommendation.

The panel 312 includes a control 320 that enables the user to accept recommendations. When no recommendations are selected, the control 320 reads "Accept All". The user can accept all recommendations by selecting the control 320 when it reads "Accept All."

When recommendations are selected, the control reads "Accept." The user can accept individual recommendations by selecting one or more individual recommendations and then selecting the control 320 when it reads "Accept."

In some implementations, when the user selects a recommendation from panel 312, the user interface presents a data change preview for the selected recommendation, as shown in FIG. 4.

FIG. 4 shows an example user interface 400 displaying a data change preview. The interface 400 includes the panel 312 that shows the list of recommendations for integrating the tables into the data model. The interface 400 includes a panel 402 that shows a preview of a portion of the data model if the recommendation is accepted.

In the example of FIG. 4, the user has selected the recommendation 404 of "Standardize date format as." The user has selected, from the drop down menu 314, a format of "MM DD, YYYY." In response to the user selection, the panel 402 shows a preview of sample changes that will be made to the table "product sales" if the recommendation of "Standardize date format as" is accepted. The panel shows a column 406 showing sample data from the table before the recommended change, and a column 408 showing a preview of the sample data from the table after the recommended change.

Figure 5:
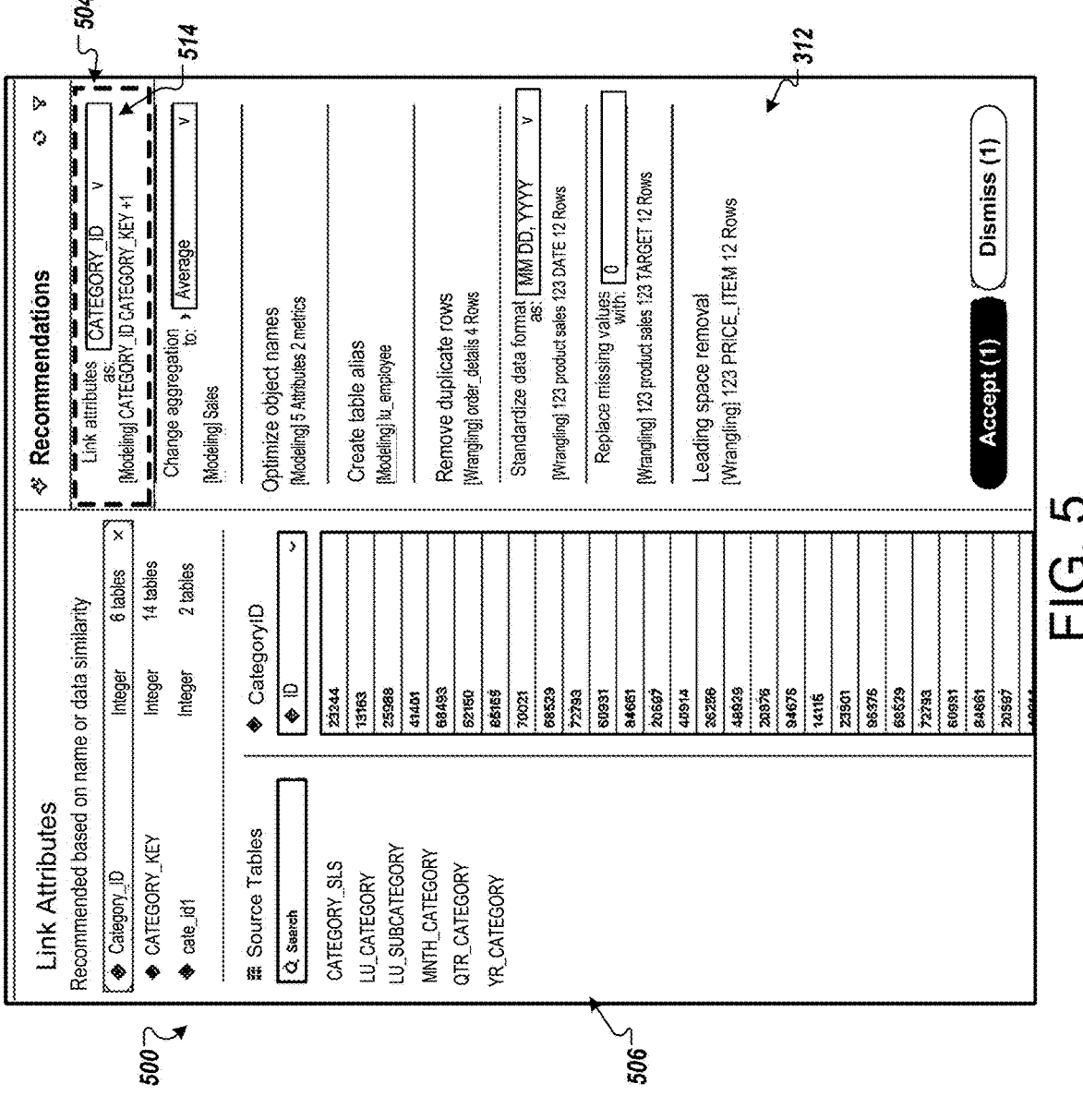

In some implementations, when the user selects a recommendation from panel 312, the user interface presents additional details about related tables, data objects, and actions to be taken, with sample data, as shown in FIG. 5.

FIG. 5 shows an example user interface 500 displaying additional details related to a recommendation. The interface 500 includes the panel 312 that shows the list of recommendations for integrating the tables into the data model.

In the example of FIG. 5, the user has selected recommendation 504 of "Link attributes as." The user has selected, from the drop down menu 314, a name of "Category ID." In response to the user selection, the interface 500 presents information in a panel 506 showing recommended link attributes for joining data between tables. The panel 506 shows a list of source tables and respective Category IDs that are to be linked between the tables.

Figure 6:
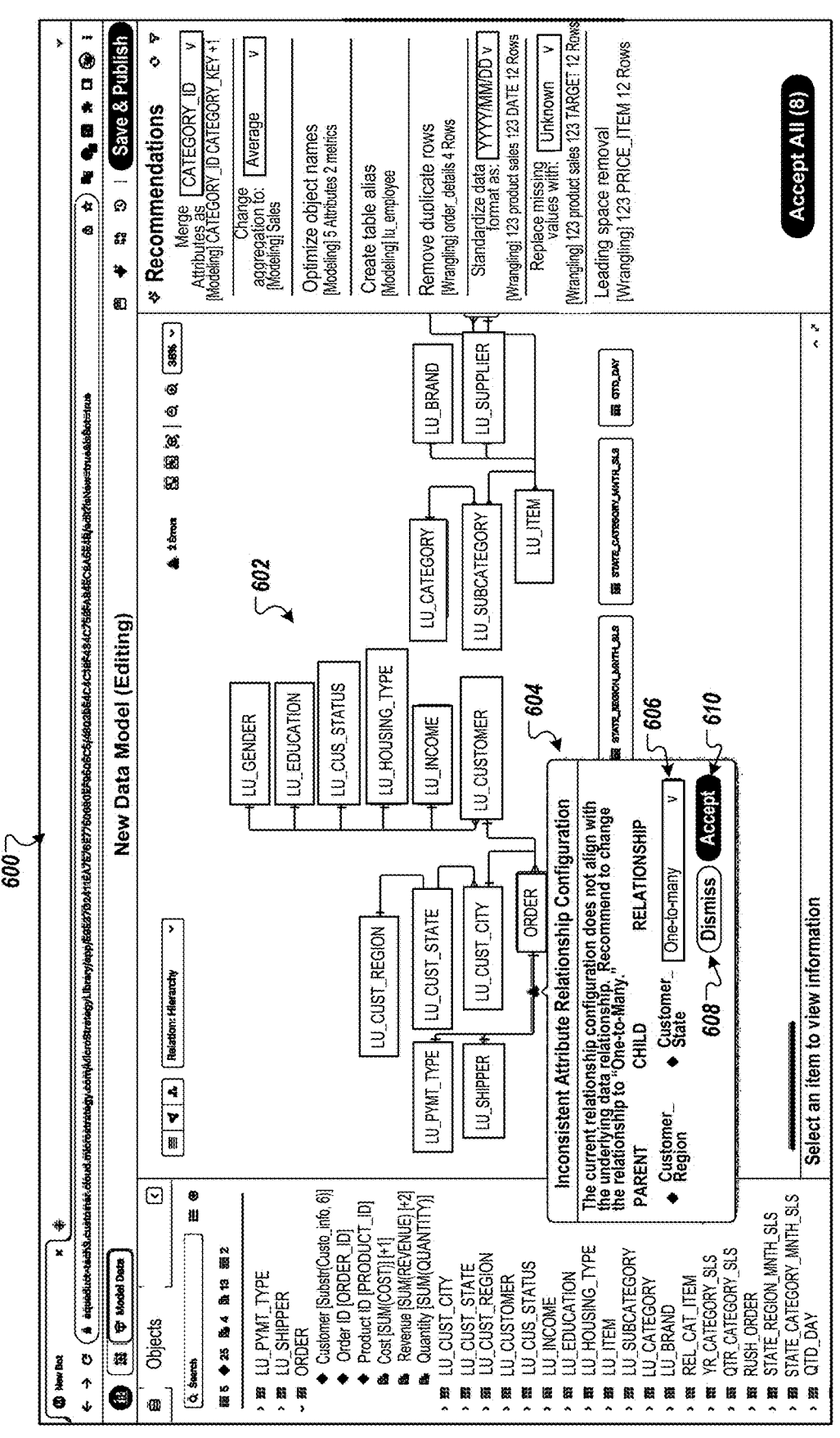

FIG. 6 shows an example user interface 600 for editing a new data model. The user interface 600 shows a graphical representation 602 of a hierarchy of data. The hierarchy was generated automatically by joining multiple data tables in response to the user request to create the data model.

The user interface 600 shows a notification window 604 indicating an inconsistent attribute relationship configuration. The notification window 604 was generated in response to a validation check that was performed on the automatically-created hierarchy. The notification window 604 includes a recommendation for changing the relationship to "One-to-Many." The notification window 604 includes a drop down menu 606 that enables the user to select a type of relationship. The notification window 604 includes a control 608 that enables the user to dismiss the recommendation, and a control 610 that enables the user to accept the recommendation.

Figure 7:
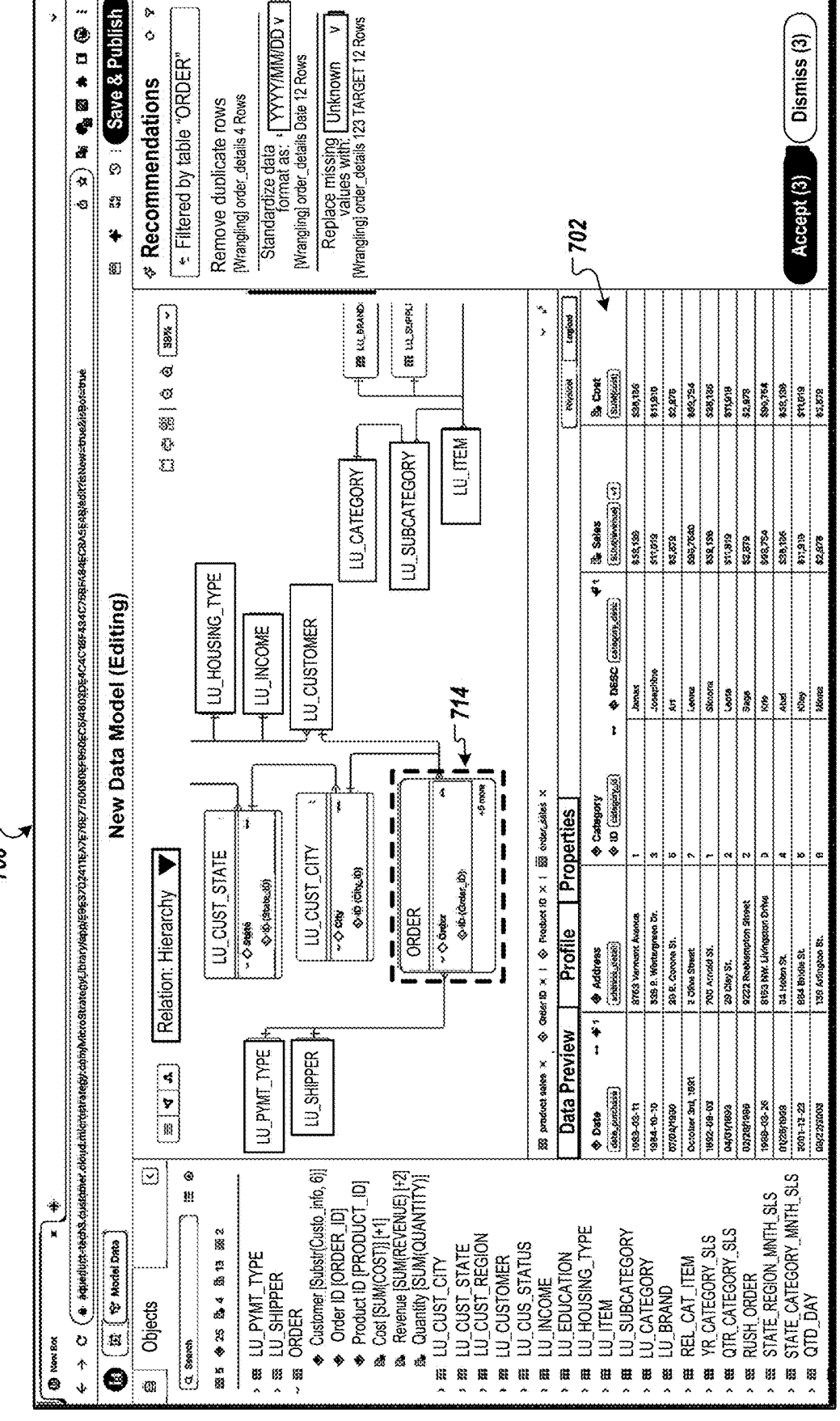

In some implementations, when the user selects portion of the graphical representation 602 of the hierarchy, the user interface presents additional details about the selected portion, as shown in FIG. 7.

FIG. 7 shows an example user interface 700 showing a zoomed in portion of the graphical representation 602 of the hierarchy shown in FIG. 6. The interface 700 includes a panel 402 that shows a preview of a portion of the data model.

In the example of FIG. 7, the user has selected a portion 714 of the hierarchy labeled "ORDER." In response to the user selection, the interface 700 presents information in the panel 702 showing a preview of data that falls under the category "ORDER."

Figure 8:
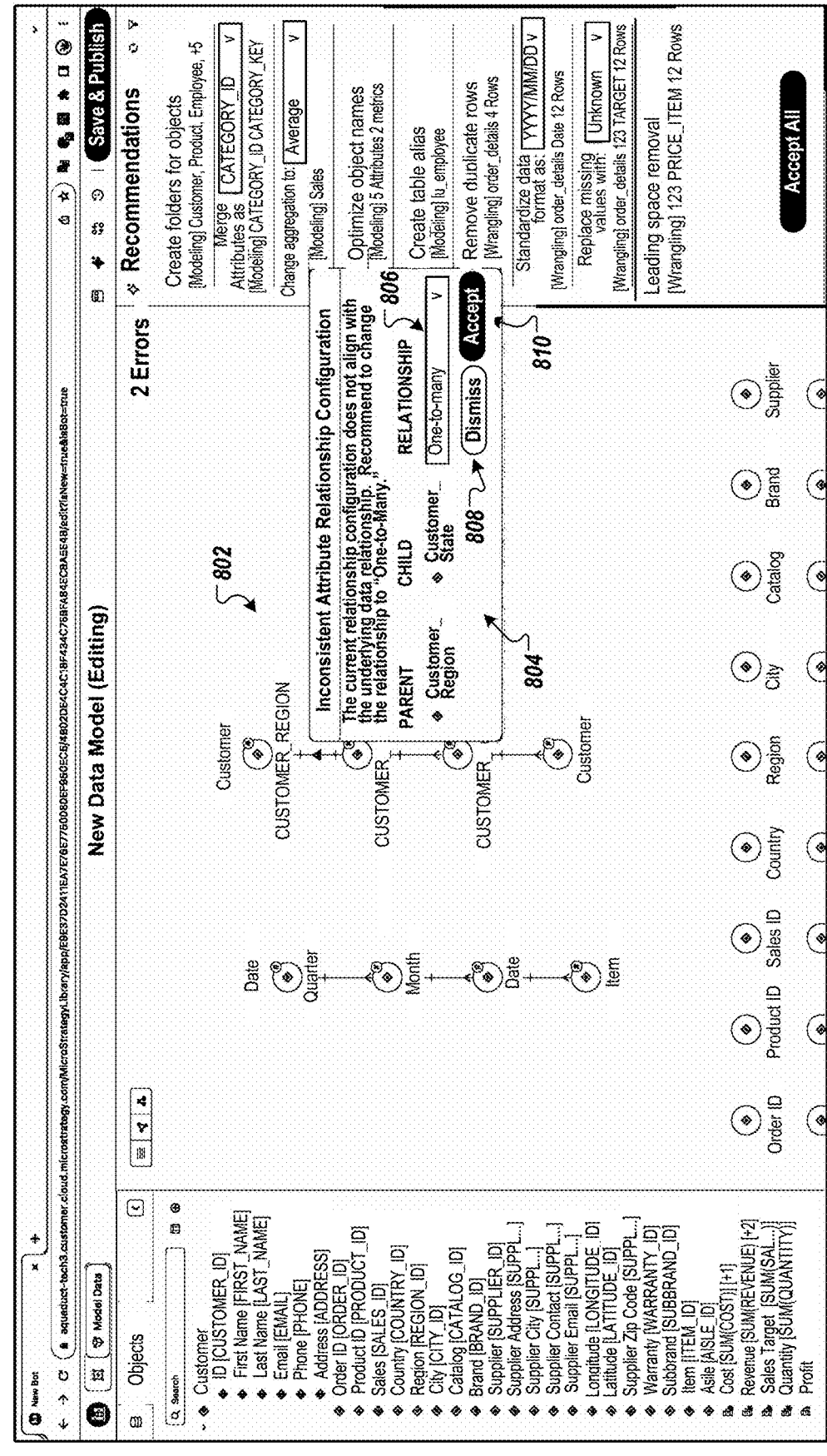

FIG. 8 shows an example user interface 800 for editing a new data model. The user interface 800 shows a graphical representation 802 of linked objects. The links were generated automatically by joining multiple data tables in response to the user request to create the data model.

The user interface 800 shows a notification window 804 indicating an inconsistent attribute relationship configuration. The notification window 804 was generated in response to a validation check that was performed on the automatically-created object links. The notification window 804 includes a recommendation for changing the relationship to "One-to-Many." The notification window 604 includes a drop down menu 806 that enables the user to select a type of relationship. The notification window 804 includes a control 808 that enables the user to dismiss the recommendation, and a control 810 that enables the user to accept the recommendation.

Figure 9:
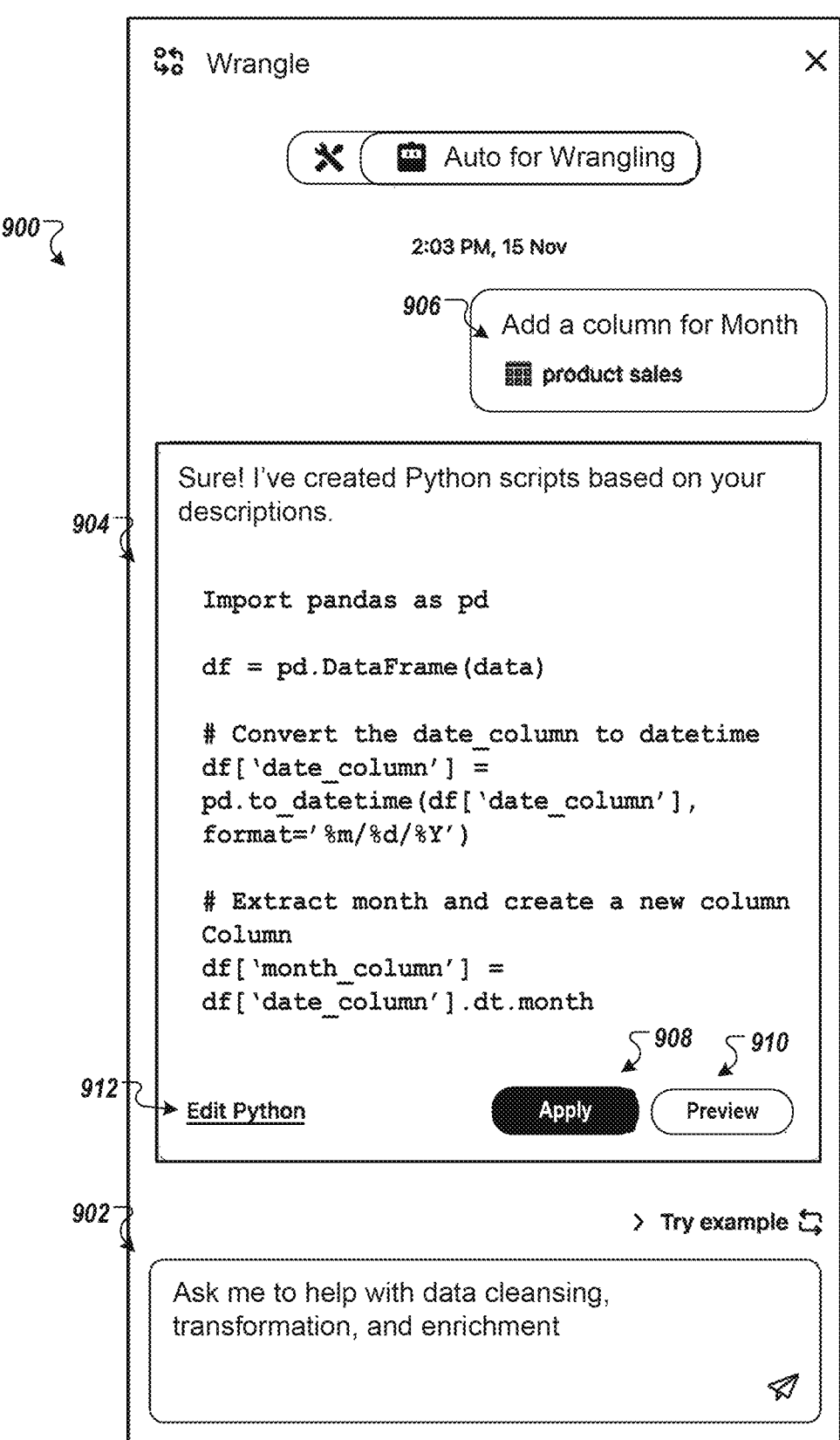

FIG. 9 shows an example user interface 900 for automatically creating a data model through a chatbot interface. The user interface 900 enables the user to access features of the system 100 through a chatbot. The user interface 900 includes a text field 902 that enables the user to input a question or request to the chatbot.

The user interface 900 includes a window 904 showing a chatbot response to a previous request 906 to "Add a column for Month." The response includes Python scripts that were automatically created based on the user request 906. The window 904 includes a control 908 that enables the user to apply the Python scripts, a control 910 that enables the user to preview the application of the Python scripts, and a control 912 that enables the user to edit the Python scripts.

Auto data modeling can improve the integration of an enterprise's data sets with AI/ML chatbots and other features. The features can improve data modelling functionality with a process and user interface that integrate (1) access to and manipulation of the data catalog (e.g., databases, data warehouses, data sources, etc.), (2) data preview functionality (e.g., showing initial data, proposed changes, and previews of results if suggested changes are applied), (3) semantic processing (e.g., semantic graph content, vector database similarity analysis, etc.), and (4) suggestions determined using AI models.

The data modelling features can significantly improve efficiency in data preparation. Businesses can benefit from features that expedite the time-consuming process of data wrangling. By automating this, the system helps organizations save time and resources, thereby increasing productivity. The data modelling features can also democratizing data analytics by reducing the amount of specialized knowledge and low-level permissions needed to perform tasks. Automatic data wrangling lowers the barrier to entry for data analytics, making these tools accessible to a broader range of professionals. Leveraging AI for data wrangling and the creation of data models provides a level of speed and efficiency that traditional manual methods cannot match.

The data modeling functionality can improve many aspects of user tasks. For example, automated data cleaning features can assist users to automatically detect and correct errors and inconsistencies in the data, to increase accuracy in later analyses without manual intervention. The system can provide automated workflows and conversation-based experiences rather than clicking buttons. Various versions can be provided, including a user-driven process supplemented with AI-generated suggestions, a partially automated process with some actions being done automatically and others suggested for user acceptance, to a fully automated process where the system performs the data management actions that have a score or confidence level that satisfies a threshold to provide the results with minimal user involvement required.

The data modeling features can allow effortless data transformation, so that the system gathers and automatically converts data into a format suitable for analysis, without requiring detailed technical knowledge by the user initiating the data import. The system can provide a guided experience where the system prompts the user about the next actions that are needed or recommended to prepare the dataset for use in analysis, e.g., by a chatbot, a database system, etc.

The system can be configured to meet the needs of various different types of users, such as business users, analysis, and data architects, with different types of functionality.

Business users may be new users or those without extensive knowledge of the data processing platform. Business users primarily consume data, and want to check new datasets or explore options that the platform gives. Business users typically do not have knowledge of how to prepare data, and prefer a plug-and-play experience without spending any time online reading documentation. To accommodate these users, the system can support the import or upload of data from sources such as files (e.g., comma separated value (CSV) files or unstructured data) and data from SaaS platforms (e.g., Shopify, Google analytics). As an example, the system can provide a user interface and workflow that would assist a new user of the platform to import data from a third-party software program, with the system automatically performing data cleaning and identifying the logical objects (e.g., metrics, attributes, etc.) and their relationships. Even if the data includes some inconsistencies or inaccuracies, the system can apply AI-suggested cleaning actions and create a data set that is ready for a chatbot to access, so the user can ask questions about the data with natural language questions.

Analysts are typically people who use business intelligence or data processing platforms in a self-service environment. Analysts typically understand the principles of object models and can effectively collaborate within the environment, such as by move swiftly between MTDI and schema workflow and can differentiate them. Analysts often know how to augment schema data with additional external sources. Analysist often desire to quickly and efficiently wrangle any data to fit into reporting needs, but dislike time-consuming manual interfaces that require multiple clicks to achieve a result. Analysts often import data from files (e.g., CSV files or unstructured data) and enterprise data sources.

The most advanced user type is a data architect, such as a data scientist, a database administrator, or analytics architect. Data architects are typically well-grounded in the rules of data analysis and data knowledge. The data architect often needs to quickly create new data pipelines and create datasets for other platform users. Data architects often prefer to avoid manual interfaces requiring multiple clicks to achieve a result, and prefer automation and advanced data processing capabilities. As an example, a data architect may have tasks that include dataset creation for application architects. The user may be asked to bring data from other reporting systems to create new AI/ML chatbots. To quickly create base datasets, the user attempts to streamline the incoming data with an existing schema. The user knows data science practices and wants the system to provide an overview of the data that is within a dataset and quickly clean it up with simple natural language commands rather than python code.

The computer system 110 can use a data catalog (e.g., a panel showing available data sets and data objects) with a comprehensive range of connection options, for connecting to both public and private cloud-based data sources as well as big data/RDBMS and file based sources.

The system can provide data preview functionality including a tabular view of all available tables, displaying their interrelations through common attributes. This view is intended to offer users a clear understanding of the data structure and relationships. To support data cleansing and wrangling, the system can provide interfaces that provide manual data wrangling capabilities like those provided for Online Analytical Processing (OLAP) and Multi-Table Data Import (MTDI) systems, enabling users to manipulate and manage data effectively.

The system can be configured to provide many types of AI-driven recommendations. For data preparation or data cleansing, AI suggestions can involve suggestions for: duplicate row removal to automatically eliminate duplicate entries, data validation and normalization (e.g., to perform regular expression checks on predefined columns to identify and correct invalid cells, such as checking the validity of email addresses against a standard format), cleansing phone numbers and other standardized data formats, converting invalid entries or blank entries (e.g., replacing negative ages or blank entries with zero values), standardizing temporal data formats (e.g., date, time, etc.), expanding abbreviations in addresses to full words, setting irreparably invalid cells to blank, removing proceeding and trailing spaces, and so on. For treating missing values, the system can recommend different strategies for different data types, such as for numeric data types suggesting blanks, zeroes, or average values for invalid/null entries, and for strings recommending use clustering, embedding, and similarity analysis for standardization. The system can also recommend column selection enhancements, such as to detect opportunities within selected columns for additional processing such as splitting, extracting, or performing operations like fill down/edit cells.

The system can also recommend data modeling actions such as: (1) automated attribute and metric mapping to simplify the process of associating data with its respective attributes and metrics; (2) hierarchy detection to automatically identify parent-child relationships within attributes, (3) metric format detection to automatically detect and apply number formatting for metrics; (4) aggregation function suggestion and first and last element aggregation support (e.g., to propose appropriate aggregation functions based on the data and name or label of metrics); (5) column or object name cleansing, although careful review is often needed as similarly named columns may represent different data in some cases; (6) column linking, e.g., based on cleansing results, suggest potential relationships between columns; (7) multi-form attribute creation, (8) lookup table detection for attributes, e.g., detect and utilize lookup tables to generate meaningful queries, enhancing the query-building process; (9) creating table aliases for lookups; (10) performing folder organization for better usability in document creation; (11) creating advanced metrics; and (12) recognizing a date- or time-related attribute with insufficient information or a string format (e.g., "Month of Year," "Quarter of Year"), and explore using AI to either create a new attribute or add an attribute form with a proper date type (this can enable the chatbots to respond appropriately to date/time related questions).

The system can provide data Source Integration, including providing the capability to connect the AI chatbot to various data sources, including databases, spreadsheets, and external APIs. The system an also facilitate data ingestion to allow users to easily import and ingest data from various sources, such as databases, spreadsheets, and external APIs, into the SaaS platform. The system can assist users in data wrangling by providing tools for data cleansing, including updating columns and data, removing duplicates, handling missing values, and standardizing data formats. The system can also provide data integration tools that support the integration of disparate data sources, allowing users to combine and correlate data. Data sources can be seamlessly integrated with the AI chatbot. Users can successfully ingest, clean, and transform data within the AI bot's environment. Data enrichment features are available and configurable. The data preview functionality provides a clear representation of the prepared data.

Figure 10:
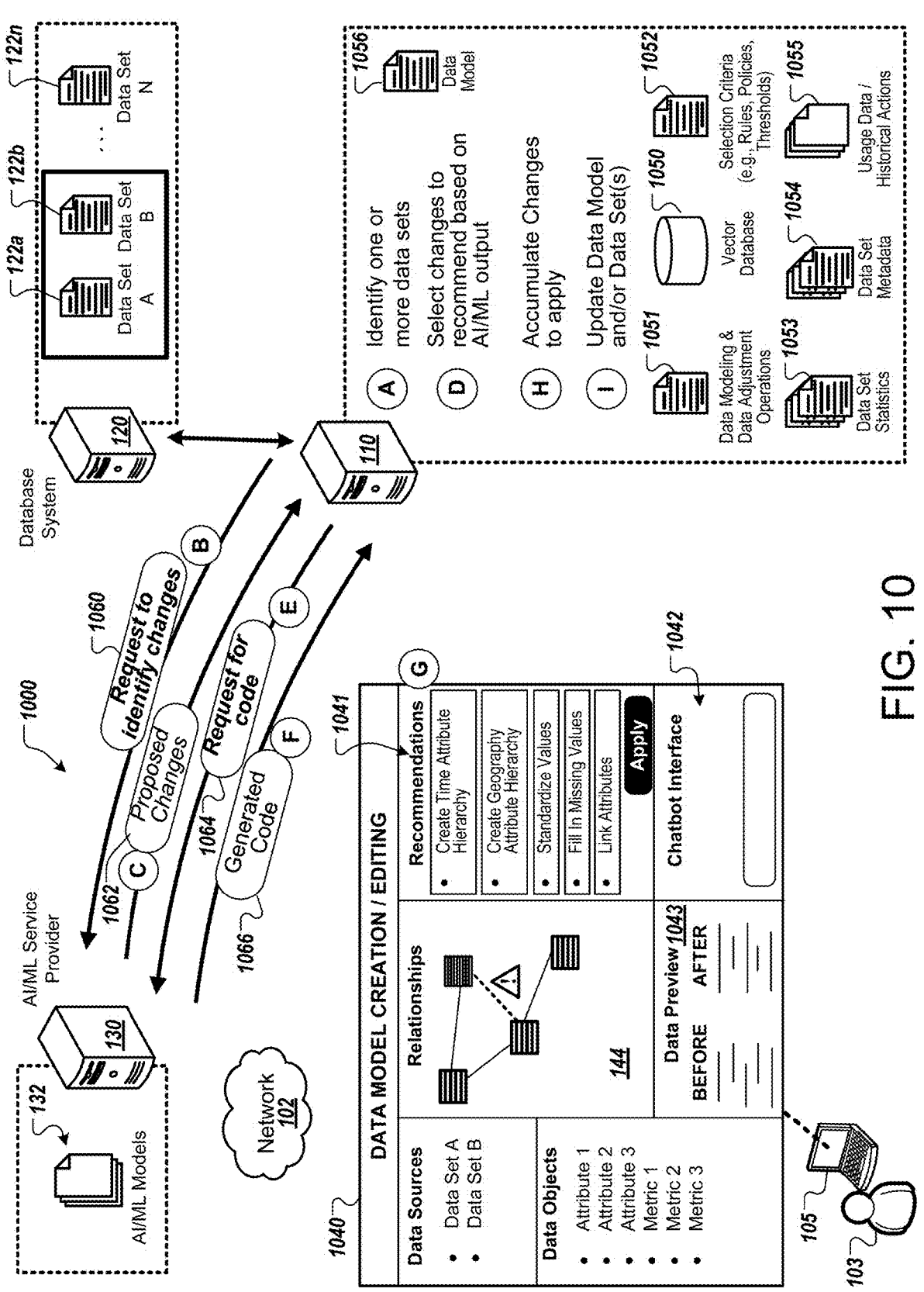

FIG. 10 is a diagram showing an example of a system 1000 for data modeling and data adjustment using artificial intelligence or machine learning. The system 1000 includes the computer system 110, the database system 120, and the AI/ML service provider 130. The system also includes a user device 105 of a user 103. The elements of the system 1000 communicate over a network 102, such as the Internet. The computer system 110 that uses AI/ML models 132 to automatically select actions for data modeling and data adjustment, as well as implement those actions so they can be carried out to create or edit a data model and to improve and enhance data sets. The computer system 110 can provide data for a user interface 1040 for data preparation and data modeling, such as a web page, a web application, data shown in a native application, etc. For example, in the example of FIG. 1, the user 103 has a user device 105, which displays a user interface 1040 based on data received from the computer system 110 over a network 102.

Workers in businesses often spend significant time and resources to perform data wrangling, including steps such as discovering the data sets that are relevant for a task, structuring data in an appropriate way (including determining appropriate data models and data schemas), cleaning the data, enriching the data, and validating the data, before the data can be published and used by servers, applications, users, and more. By leveraging AI/ML models 132 in some or all of the steps of data wrangling, including in generating and adjusting data models, the system 1000 can streamline the process of making data sets accessible and usable by many different systems and software applications. The use of the AI/ML models 132 and automated selection of data modeling and data adjustment actions increases productivity and makes data analytics tools more accessible to a broader range of users.

The system 1000 can perform automatic modeling and data adjustment to streamline data preparation and modeling, for analysis, chatbot integration, and other uses. The system improves user interaction with data across all levels, from novice to expert, by automating much of the data cleaning, transformation, and enrichment processes. This efficiency reduces manual input and expertise requirements for users, freeing users to focus on analysis and insights, which speeds up decision-making and deployment. The system 1000 can align the capabilities of multi-table data import (MTDI) systems with data processing platforms, paving the way for a seamless modeling experience.

The system 1000 can assist users with automated data cleaning. In many cases, a business user wants the system 1000 to automatically detect and correct errors and inconsistencies in the data, to ensure accuracy in my analyses without manual intervention. The system 1000 allows this process to occur through automated workflows and conversation-based experiences rather than clicking buttons to search for or create changes to data sets and data models. The system 1000 can also enable users to perform data transformation with minimal effort. Business users often need to convert data into a format suitable for analysis, without needing detailed technical knowledge of database structure and operation. The system 110 provides a guided experience where the system proactively identifies and prompts the about the next actions to prepare a dataset or data model.

Referring to FIG. 1, the computer system 110 initially communicates with the user device 105 to provide information for the user interface 1040 over the network 102. For example, the user interface 1040 can be configured to assist and guide the user 103 through data preparation and data modeling. In some implementations, the user 103 can use the user interface 1040 to prepare a data set, potentially combining data from multiple data sources or data sets, that can be used as the source of data for an AI/ML chatbot. In other cases, the user uses the user interface 1040 for data preparation for other purposes, such as publishing a data cube, providing data to be used by an application, making data available to a third-party system, and so on. The user interface can be part of a software-as-a-service (SaaS) platform, which assists users to prepare data and generate data models, even if the data resides on premises, on cloud computing platforms, or a combination of multiple locations. The user 103 authenticates to the computer system 110, so that the user's identity is determined and the user's permissions can be determined.

In the example, a series of operations and data flows are shown as stages labeled (A) through (I). The operations can be performed in the order indicated or in another order. These stages represent operations for an example as discussed below, but the same operations can be repeated or supplemented in various combinations and sub-combinations also.

In stage (A), the computer system 110 identifies one or more data sets to be used for data modeling or data preparation. Identifying a data set is typically one of the first steps performed. For example, the user 103 may use the user interface 1040 to select data files to upload or import, or the user 103 may select data sets or data sources that have already been registered with the computer system 110. For example, the user 103 may specify one of the data sets 122a-122n that is available from the database system 120. As another example, the user 103 may specify a data set available from a third-party system, which makes data available through an application programming interface (API), cloud computing platform, or other access mechanism. The user 103 can identify or add a data set in various ways, such as by dragging and dropping a file, selecting an icon in the user interface 1040, selecting data sets from a list, and so on. In the example, the user 103 selected two data sources, Data Set A 122a and Data Set B 122b.

In some implementations, the computer system 110 performs data discovery to find and suggest to the user 103 data sets to use. The computer system 110 can use the AI/ML models 132 to perform data discovery, to find relevant or related data at the early stages of data modeling or data preparation. For example, in addition to or instead of the user 103 manually selecting data sources or data sets, the computer system 110 can analyze and characterize data sets 122a-122n available and can identify one or more data sets that are appropriate for a user's topic or task.

For example, to prepare to perform data discovery, in advance of a user's task, the computer system 110 can gather information about various data sets 122a-122n, information such as names of data sources, tables, and data objects, as well as data characterizing the types of content in the data sets 122a-122n. The computer system 110 can then store the information in a vector database 150, such as by generating a vector in a high-dimensional space representing the semantic interpretation (and potentially structure and other characteristics) of each data set or for smaller portions of each data set.

Once the vector database 150 has been populated, the computer system 110 can provide an interface for the user 103 to specify keywords or topics of interest, and the computer system 110 can use the vector database 150 to identify a set of tables or other data sets that are relevant. For example, after receiving a query from the user 103, the computer system 110 can determine a query vector representation of the keywords or topics of interest, and compare the query vector representation with the vector representations for data tables to determine which are closest to the query vector representation. In some implementations, the computer system 110 uses the AI/ML models 132 in this process, with the results from the vector database 150 being provided to an AI/ML model 150 for further processing and assessment. In this case, the computer system 150 can use result-assisted generation (RAG) for data discovery to identify data sets relevant to a user's keywords or topics, such as a query like "sales last year." The computer system 110 selects the data tables with the vector representations closest to the query vector representation, and can present these to the user 103, along with data indicating known or inferred relationships among the selected data tables. In other cases, information about the results from the vector database are provided to the AI/ML models 132 processing first, and data tables that the AI/ML models 132 indicate to be most relevant to the query (in view of the vector database results) are then provided to the user. The user can approve the selected data tables, or select a subset of the data tables to use, which can begin the process of generating recommendations for data modeling and data adjustment actions.

In stage (B), the computer system 110 uses information about the identified one or more data sets to request that the AI/ML models 132 determine data modeling or data preparation actions. The computer system 110 initiate the process of analyzing data sets and identifying recommended data modeling and data preparation actions, to automatically surface recommendations to the user 103.

The computer system 110 can identify appropriate actions in various different ways. In some cases, the computer system 110 analyzes the data sets 122a, 122b and determines data set statistics 1053 for the different data sets and their components. These statistics 1053 and other data can characterize the selected data sets 122a, 122b, indicating information that describes the structure, meaning, and content of the data sets 122a, 122b. The computer system 110 can also apply selection criteria 1052, which specify rules, policies, thresholds, and other criteria for different types of actions. For example, the selection criteria 1052 can indicate standardization rules or preferred formats for different types of data (e.g., addresses, names, email addresses, phone numbers, etc.), and the computer system 110 can apply these rules to detect when data of a particular type deviates from the preferred format or uses inconsistent formats. The computer system 110 can also store a set of operations 1051 to evaluate. For example, the set of operations 1051 can include a list of data modeling actions and data preparation actions, along with a criteria for determining when each is appropriate. For some types actions, the computer system 110 can determine that an action is appropriate without using the AI/ML models.

The computer system 110 can also use the AI/ML models 132 to identify data modeling and data processing actions. For example, the computer system 110 can generate and send a request 1060 for the AI/ML models 132 to determine changes to a data model or data set. The computer system 110 can include in the request 1060 a prompt or instruction for the AI/ML models 132 to consider each of a set of different possible actions, and to determine whether each is appropriate for the current data set. The computer system 110 can include in the request 1060 information about the data sets 122a, 122b, such as the column names, table names, metadata, sample data (e.g., a few rows or synthetic data representative of the data content), and so on. This information can provide the AI/ML models 132 the ability to refer to components of the data sets 122a, 122b with identifiers or names that are consistent with those used by the computer system 110, as well as give the AI/ML models 132 information to infer data types and the interpretation of different portions of the data.

In addition, the computer system 110 can include in the request 1060 the data set statistics 1053 and data set metadata 1054, which can further give the AI/ML models 132 the ability to detect anomalies and infer the overall characteristics of the data sets 122a, 122b, even when the content of the data sets 122a, 122b is not provided. This improves privacy and saves time and network bandwidth because the data sets 122a, 122b do not need to be transferred to the AI/ML service provider 130. In addition, providing characterization data or measures derived from the data sets 122a, 122b speeds the processing of the AI/ML models 132 and reduces the computational complexity and cost, because the AI/ML models 132 do not need to process the content of the data sets 122a, 122b.

The computer system 110 can include other information in the request 1060 to assist the AI/ML models 132 in making an accurate identification of data modeling and data processing actions. For example, the computer system 110 can provide the set of operations 1051, so the AI/ML models 132 has a defined set of actions or changes to consider, and so the AI/ML models 132 can consider each of the possible changes. In addition, the computer system 110 can provide the selection criteria 1052, so the AI/ML model 132 can apply the rules, policies, thresholds, or other criteria in generating its output. Optionally, the computer system 110 can also provide examples of the various different types of possible actions or changes. For example, this can include, for each type of action to be considered, (1) one or more example patterns, data set characteristics, or data contexts when the action is appropriate, and (2) one or more example patterns, data set characteristics, or contexts when the action is not appropriate. These examples can guide the AI/ML models 132 by giving reference examples for detecting when the different types of actions are appropriate. In addition, the computer system 110 can further examples through usage data or historical actions 1055. The data 1055 can provide records or statistics for examples where data modeling or data preparation actions were recommended to users, together with the result whether the user accepted or dismissed the recommendation. More generally, examples of properly-formed reference data models or data schemas can be provided, labeled as needing particular actions or not. This can guide the AI/ML models 132 to determine when the data set or data model being assessed is similar to those that previously needed a particular type of change (so that change should be recommended), or if the data set has characteristics that are more similar to data sets or data models that did not need that type of change (so that change should not be recommended).

In stage (C), the computer system 110 receives output 1062 that the AI/ML models 132 generated in response to the request 1060. The output 1062 indicates a set of changes that one or more AI/ML models 132 indicated to be appropriate for the data model being edited or for preparing the data sets 122a, 122b. For example, the output 1062 can indicate a subset of the set of operations 1051 that were provided to the AI/ML model 162 to consider. As discussed above, the request 1060 can provide the selection criteria 1052 for determining whether each type of change is appropriate. The request 1060 can also include instructions to select or indicate only changes or actions that are most relevant or have a minimum level of confidence or likelihood of being appropriate for the current data.

In some implementations, the computer system 110 includes in the request 1060 an instruction to provide a ranking of the appropriateness of the different actions or changes. In addition, or as an alternative, the computer system can instruct the AI/ML models 132 to provide a score for each action or change selected, such as a confidence score or relevance score. In some cases, the score for a type of change can be a measure of how well the AI/ML models 132 estimates that information about the current data model or data sets 122a, 122b matches or is similar to other examples in which that particular change was performed. As a result, the output 1062 from the AI/ML models 132 can include indications of the appropriateness of different changes, whether relative to each other (e.g., a ranking) or on an absolute or non-relative scale.

In stage (D), the computer system 110 analyzes the output 160 from the AI/ML models 132 and select changes or actions to perform. The output 160 can indicate a subset of potential changes that the AI/ML models 132 are most likely to be appropriate for the current data sets 122a, 122b. The computer system 110 can further assess the appropriateness of these changes, by verifying the appropriateness according to the selection criteria 1052 and by generating its own set of scores for the relevance or appropriateness of the selected changes. The computer system 110 can thus further limit or filter the changes suggested by the AI/ML models 132 based on its own analysis, to ensure accuracy and ensure that the recommendations made to the user 103 will be useful. In addition, the computer system 110 can supplement the set of proposed changes from the AI/ML models 132 with items that the computer system 110 determined from its own analysis of the data sets 122a, 122b.

In stage (E), the computer system 110 requests for the AI/ML models 132 to generate interpretable or executable code to carry out the set of changes that the computer system 110 has selected. For example, the computer system 110 generates a second request 162 for code to carry out each of the changes that the computer system 110 has selected based on its own analysis and its review of the output 1062 from the AI/ML models 132. As an example, the computer system 110 can request for the AI/ML models 132 to generate code for functions in the Python programming language or in another programming language. To facilitate the processing by the AI/ML models 132, the computer system 110 can provide with the request 1064 a list of the changes that the computer system 110 has selected to be recommended to the user 103. If needed, the computer system 110 can again provide descriptions of the types of changes to be made as well as characteristics of the data sets 122a, 122b. Nevertheless, in many cases, the AI/ML models 132 will retain this information from the context of the session, as long as the amount of data that has not exceeded the context window for the AI/ML model 132. When appropriate, the computer system 110 can provide additional context about the changes to be made, so that the generated code appropriately references the particular tables, columns, data objects, rows, fields, and other items that need to be changed. In other cases, the computer system 110 can fill in values for parameters in the code to make these references after receiving the generated code.

In addition, new code may not need to be generated for every change period for example, many standardized functions such as removing leading or trailing whitespace may be already stored by an available to the computer system 110, so they do not need to be generated again.

In stage (F), the computer system 110 receives generated code 1066 that the AI/ML models 132 provide in response to the second request 1064. The computer system 110 you can perform validation and testing operations on the generated code 1066, to verify that each function or type of change that the code implements can be executed properly. If there are errors or inconsistencies, the computer system 110 can make edits or perform iterative requests to the AI/ML models 132 to correct the code. In addition, the computer system 110 can update fields or values in the code to specify particular portions of the data sets that should be operated on. For example, for code configured to operate on particular fields or particular values, the computer system 110 can identify or verify that the code operates on the fields or values that the function should operate on.

In stage (G), the computer system 110 provides data indicating the selected changes to the user device 105 over the network 102. The user device 105 updates the user interface 1040 to show the various recommended items. In the example, the user interface is 1040 populates a recommendations area 1041 to indicate recommendations including creating a time attribute hierarchy, creating a geography attribute hierarchy, standardizing values, filling in missing values, and linking together certain attributes. Beyond indicating a type or category of change to make, the various items can indicate specifically which data objects, tables, types of values, or other specific items would be changed. The items in the recommendation area 1041 are selectable so that the user 103 can interact with them one by one to instruct individual recommended changes to be made. Similarly, the recommendation area 1041 can include one or more controls to apply all recommended changes. The recommended changes can include items that prepare the data, and thus alter or adjust the data sets 122a, 122b. Other recommended changes can include items that build or alter a data model for the data sets 122a, 122b.

The user interface 1040 includes other areas that can facilitate changes to data models and data sets. For example, the user interface 1040 can include a chatbot interface 1042 with a text field, in which the user 103 can enter text prompts or instructions to a chatbot. The chatbot is provided the context of the current data model being generated and the data sets 122a, 122b, so the user 103 can refer to items on screen or in the data sets 122a, 122b when requesting changes.

The user interface 1040 also shows a data preview area 1043 that can be used to illustrate the effect of one or more proposed changes. For example, if the user selects one of the items in the recommendation area 1041, the user interface 1040 is updated to show example records with the values before making the change and the resulting values that would occur after making the change. As a result, the user 103 can see the effect of a recommended change even before accepting or applying that change.

The user interface 1040 shows another area 144 that illustrates connections among data objects. For example, the area 144 can show tables and the relationships among them, or data objects and relationships among them. In some cases, the recommended changes determined by the computer system 110 include changes to add, alter, or remove relationships in the data model. For example, the area 144 shows a warning that a relationship represented by a dotted line does not meet validation rules, and so needs to be removed or changed. This type of recommended change can be determined by the computer system 110 using its own processing of rules and/or based on analysis and output generated by the AI/ML models 132.

As the user 103 accepts or applies recommended changes from the recommendation area 1041, and makes requests in the chatbot interface 1042, and edits relationships in the area 144, the data model represented in the user interface 1040 is also updated. Areas of the user interface 1040 that indicate the attributes, metrics, and other data objects in the data model are also updated.

In stage (H), the computer system 110 accumulates changes to make based on the interactions of the user 103 with the user interface 1040. As the user 103 applies recommended changes or makes manual edits, the computer system 110 maintains a list of these items, and during the session builds the list of changes to later apply. In many cases, changes that would affect the data sets 122a, 122b are not applied immediately, which gives time for the user 103 to review and consider the full set of changes before incurring the processing and delay of applying the changes.

In stage (I), the computer system 110 applies the accumulated changes to update the data model and or data sets 122a, 122b. As noted above, many changes to the data model can be performed over the course of the users interactions, especially so those changes are reflected in the user interface 1040 and in the data model records. Nevertheless, other accumulated changes corresponding to recommended items that the user accepts or applies can be deferred until a publishing event triggers application. For example, the user 103 finalizes the data model and selects to publish the data to an application, a chatbot, or another system. In response, the computer system 110 performs the functions (e.g., generated code) for the recommend items that the user 103 has applied, as part of finalizing and publishing the data. The computer system 110 also stores the data model 1056 and can make it available to other systems to be able to access and interpret the data in the data sets 122a, 122b.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

The invention claimed is:

1. A method performed by one or more computers, the method comprising:

providing, by the one or more computers and for presentation at a user device, data for a user interface to create or edit a data model;

receiving, by the one or more computers, user input through the user interface that indicates one or more data sets;

in response to the receiving of the user input indicating the one or more data sets:

accessing, by the one or more computers, a data model corresponding to the one or more data sets that are indicated by the user input, wherein the data model is accessed from one or more data repositories comprising data models for different data sets; and generating, by the one or more computers, a set of recommendations for data modeling, data preparation, or data enrichment for the one or more data sets, wherein at least one recommendation in the set of recommendations is generated based on a set of stored rules that specify criteria for generating recommendations, wherein the at least one recommendation is determined to be appropriate for the one or more data sets based on the stored rules, wherein the at least one recommendation comprises at least one of: duplicate row removal, standardizing a temporal data format, enriching data, or filling in one or more missing values, and wherein at least one recommendation in the set of recommendations is generated using one or more artificial intelligence and/or machine learning (AI/ML) models;

prioritizing, by the one or more computers, the recommendations in the set of recommendations for presentation in the user interface based on user acceptance or user dismissal of previous recommendations by one or more users;

providing, by the one or more computers, the set of prioritized recommendations for display in the user interface in association with one or more interactive controls to accept or dismiss the recommendations;

in response to receiving user input accepting one or more of the prioritized recommendations in the set of recommendations, updating, by the one or more computers, the data model and the one or more data sets to apply one or more updates corresponding to the accepted recommendations; and providing, by the one or more computers, the updated one or more data sets and the updated data model to a chatbot or other application, wherein the updated data model indicates column names for columns in the updated one or more data sets and the updated data model includes data describing metrics and attributes of the updated one or more data sets.

2. The method of claim 1, wherein the one or more AI/ML models comprises a large language model (LLM).

3. The method of claim 1, comprising repeatedly providing additional recommendations for display in the user interface as the data model is being created.

4. The method of claim 1, comprising learning from user input that accepts or dismisses recommendations for data modeling, data preparation, or data enrichment, to alter which recommendations are presented for future creation or editing of data models.

5. The method of claim 1, comprising:

searching through existing data repositories using to find data sets and models; and providing a recommendation that indicates a data source to add to the data model.

6. The method of claim 1, comprising storing information about attributes and metrics from data sets in a vector database.

7. The method of claim 6, comprising using the one or more AI/ML models and the vector database to determine whether portions of the one or more data sets represent attributes or metrics.

8. The method of claim 6, comprising:

providing a list of column names to the one or more AI/ML models along with a description of metrics and attributes; and receiving, from the one or more AI/ML models, an indication of column names with a respective classification.

9. The method of claim 6, comprising:

determining a vector representation for each column of one or more columns of data of the one or more data sets;

calculating a distance between the vector representations of the one or more columns and vector representations from the vector database; and based on the calculated distances, determining, for each column of the one or more columns of data, at least one of:

a type of data object corresponding to the column, a category or dimension represented by the column, or a semantic meaning of data in the column.

10. The method of claim 6, comprising using the vector database to infer hierarchy relationships among columns or data objects of the one or more data sets, based on similarity to other data sets described by the vector database.

11. The method of claim 1, obtaining, from the one or more AI/ML models, inferred information for a portion of the one or more data sets including a semantic role, a data type, a data format, a delimiter, or default action to perform when data is missing.

12. The method of claim 1, wherein the set of recommendations comprises a recommendation for an aggregation level for data summarization determined based on characteristics of the one or more data sets.

13. The method of claim 1, comprising performing automatic relationship detection and automatic relationship validation for relationships among data objects in the one or more data sets.

14. The method of claim 1, wherein the set of recommendations comprises a data modelling recommendation comprising at least one of:

creating a hierarchy or link between multiple data sets, creating a new relationship between multiple data objects, or associating data from the one or more data sets with an attribute or metric.

15. A system comprising:

one or more computers; and one or more non-transitory computer-readable media storing instructions that are operable, when executed by the one or more computers, to cause the system to perform operations comprising:

providing, by the one or more computers and for presentation at a user device, data for a user interface to create or edit a data model;

receiving, by the one or more computers, user input through the user interface that indicates one or more data sets;

in response to the receiving of the user input indicating the one or more data sets:

accessing, by the one or more computers, a data model corresponding to the one or more data sets that are indicated by the user input, wherein the data model is accessed from one or more data repositories comprising data models for different data sets; and generating, by the one or more computers, a set of recommendations for data modeling, data preparation, or data enrichment for the one or more data sets, wherein at least one recommendation in the set of recommendations is generated based on a set of stored rules that specify criteria for generating recommendations, wherein the at least one recommendation is determined to be appropriate for the one or more data sets based on the stored rules, wherein the at least one recommendation comprises at least one of: duplicate row removal, standardizing a temporal data format, enriching data, or filling in one or more missing values, and wherein at least one recommendation in the set of recommendations is generated using one or more artificial intelligence and/or machine learning (AI/ML) models;

prioritizing, by the one or more computers, the recommendations in the set of recommendations for presentation in the user interface based on user acceptance or user dismissal of previous recommendations by one or more users;

providing, by the one or more computers, the set of prioritized recommendations for display in the user interface in association with one or more interactive controls to accept or dismiss the recommendations;

in response to receiving user input accepting one or more of the prioritized recommendations in the set of recommendations, updating, by the one or more computers, the data model and the one or more data sets to apply one or more updates corresponding to the accepted recommendations; and providing, by the one or more computers, the updated one or more data sets and the updated data model to a chatbot or other application, wherein the updated data model indicates column names for columns in the updated one or more data sets and the updated data model includes data describing metrics and attributes of the updated one or more data sets.

16. The system of claim 15, comprising wherein the operations comprise using a vector database to infer hierarchy relationships among columns or data objects of the one or more data sets, based on similarity to other data sets described by the vector database.

17. The system of claim 15, wherein the operations comprise learning from user input that accepts or dismisses recommendations for data modeling, data preparation, or data enrichment, to alter which recommendations are presented for future creation or editing of data models.

18. One or more non-transitory computer-readable media storing instructions that are operable, when executed by one or more computers, to cause the one or more computers to perform operations comprising:

providing, by the one or more computers and for presentation at a user device, data for a user interface to create or edit a data model;

receiving, by the one or more computers, user input through the user interface that indicates one or more data sets;

in response to the receiving of the user input indicating the one or more data sets:

accessing, by the one or more computers, a data model corresponding to the one or more data sets that are indicated by the user input, wherein the data model is accessed from one or more data repositories comprising data models for different data sets; and generating, by the one or more computers, a set of recommendations for data modeling, data preparation, or data enrichment for the one or more data sets, wherein at least one recommendation in the set of recommendations is generated based on a set of stored rules that specify criteria for generating recommendations, wherein the at least one recommendation is determined to be appropriate for the one or more data sets based on the stored rules, wherein the at least one recommendation comprises at least one of: duplicate row removal, standardizing a temporal data format, enriching data, or filling in one or more missing values, and wherein at least one recommendation in the set of recommendations is generated using one or more artificial intelligence and/or machine learning (AI/ML) models;

prioritizing, by the one or more computers, the recommendations in the set of recommendations for presentation in the user interface based on user acceptance or user dismissal of previous recommendations by one or more users;

providing, by the one or more computers, the set of prioritized recommendations for display in the user interface in association with one or more interactive controls to accept or dismiss the recommendations;

in response to receiving user input accepting one or more of the prioritized recommendations in the set of recommendations, updating, by the one or more computers, the data model and the one or more data sets to apply one or more updates corresponding to the accepted recommendations; and providing, by the one or more computers, the updated one or more data sets and the updated data model to a chatbot or other application, wherein the updated data model indicates column names for columns in the updated one or more data sets and the updated data model includes data describing metrics and attributes of the updated one or more data sets.

* * * * *